(12) United States Patent
Li et al.

(10) Patent No.: US 9,852,661 B2
(45) Date of Patent: Dec. 26, 2017

(54) SELF LAMINATING LABELS

(71) Applicant: CCL Label, Inc., Framingham, MA (US)

(72) Inventors: Stephen Li, Huntington Beach, CA (US); Alejandro Gerardo Veyna Hernandez, Tijuana (MX); Anahit Tataryan, Eastvale, CA (US); Joshua Petrie, Yorba Linda, CA (US); Jay Sato, Mission Viejo, CA (US); Le-Hoa Hong, Temple City, CA (US); Sriram Venkatasanthanam, Chino Hills, CA (US)

(73) Assignee: CCL LABEL, INC., Framingham, MA (US)

( * ) Notice: Subject to any disclaimer, the term of this patent is extended or adjusted under 35 U.S.C. 154(b) by 0 days.

(21) Appl. No.: 14/627,847

(22) Filed: Feb. 20, 2015

(65) Prior Publication Data

US 2016/0247420 A1    Aug. 25, 2016

(51) Int. Cl.
| | |
|---|---|
| *G09F 3/02* | (2006.01) |
| *G09F 3/10* | (2006.01) |
| *B32B 27/08* | (2006.01) |
| *B32B 27/10* | (2006.01) |
| *B32B 3/02* | (2006.01) |

(52) U.S. Cl.
CPC ................. *G09F 3/02* (2013.01); *B32B 3/02* (2013.01); *B32B 27/08* (2013.01); *B32B 27/10* (2013.01); *G09F 3/10* (2013.01); *B32B 2255/00* (2013.01); *B32B 2307/75* (2013.01); *B32B 2405/00* (2013.01); *B32B 2519/00* (2013.01); *G09F 2003/0201* (2013.01); *G09F 2003/0226* (2013.01); *G09F 2003/0255* (2013.01)

(58) Field of Classification Search
CPC ..... G09F 3/00; G09F 3/02; G09F 3/10; G09F 2003/025; B32B 7/00; B32B 2250/03; Y10T 428/14
See application file for complete search history.

(56) References Cited

U.S. PATENT DOCUMENTS

| | | | | |
|---|---|---|---|---|
| 4,951,970 | A  * | 8/1990 | Burt ................................. | 283/67 |
| 5,518,787 | A  * | 5/1996 | Konkol ........................... | 428/43 |
| 6,863,311 | B2 * | 3/2005 | Riley .................... | G09F 3/0288 283/101 |
| 7,802,388 | B2 * | 9/2010 | Henkel et al. .................. | 40/638 |
| 2005/0025924 | A1 * | 2/2005 | Toyama ....................... | 428/40.1 |

* cited by examiner

*Primary Examiner* — Patricia L Nordmeyer
(74) *Attorney, Agent, or Firm* — McDonald Hopkins LLC

(57) ABSTRACT

A labeling assembly is shown and described herein. A labeling assembly for laminating labels may include a label sheet, a laminating sheet and an alignment member. The alignment member may allow folding of the label sheet and laminating sheet. The label sheet may include a facestock sheet and a liner sheet. Labels may be pre-cut in the facestock sheet. The laminating sheet may include a laminae film sheet and a liner sheet. Protective covers may be pre-cut in the liner sheet and laminae overlays may be pre-cut in the laminae film sheet. The protective covers may be removed to expose an adhesive portion of the laminae overlay. The label sheet and the laminating sheet may be folded onto each other at the alignment member. The laminae overlay may adhere to the label to form a removable laminated label.

34 Claims, 22 Drawing Sheets

SELF LAMINATING LABELS

FIELD OF INVENTION

The present disclosure generally relates to systems for laminating labels. More particularly, the disclosure relates to a system of label assemblies that are self-laminating.

BACKGROUND

Labels for labeling a surface or an object can include an adhesive side and a writing side. The adhesive side generally includes some form of glue or other substance that allows placement of a label on a surface, such as paper. Laminating labels generally includes passing a printed or written on label through a laminating machine or placing a laminate film on a label. A user may cut the laminate film to a desired size, and the user may attempt to align the cut laminate film and the label.

Users often make errors when laminating labels. Such errors may result in air bubbles forming between a label and a laminate film, misaligned edges, and improper cutting. Some of these errors may result in laminated labels having an undesirable finished look. Other errors may make labels less stable as the laminate film and label may become separated due to misalignment or the like.

In some laminating or labeling systems, laminate film and facestock can be wasted as users make errors or as excess areas are not usable. Further, users are required to utilize different sheets or systems to label and laminate labels. Therefore, there is a need for improved laminating systems associated with labels to allow for improved functionality and user satisfaction. There is also a need for an improved labeling system that increases the usability of laminated labels.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

A labeling system is shown and described herein. The labeling system may include a self-laminating label assembly including a label sheet and a laminating sheet. The label sheet may include an array of labels cut into a facestock sheet that is releasably adhered to a liner sheet of the label sheet. The laminating sheet may include an array of removable laminae overlays cut into a laminate film that is releasably adhered to another liner sheet. The label sheet and the laminate sheet may be connected to form the laminating label assembly. The laminating label assembly may be sized to fit in most personal printers. A personal printer system may be configured to print information on the labels of the laminating label assembly. Further, the laminating label assembly may be sized to fit in professional or industrial printers that may print information on the laminating label assembly.

In another aspect, laminating label assembly may include an alignment member. The alignment member may be a perforated line formed in at least one of the label sheets or laminate sheets. The alignment member allows a user to easily fold the laminating label assembly such that labels of the array of labels and laminae overlays of the array of laminae overlays are aligned when folded.

The labels may comprise a material that accepts ink or other substances used for writing or printing. A protective liner may be removed from a laminae overlay to expose an adhesive surface. The laminate sheet and the label sheet may be folded at the alignment member such that the exposed adhesive surface contacts a corresponding label. The adhesive surface of the laminae overlay may adhere to the corresponding label. The laminae overlay, together with the adhered label, may be removed from any liner sheets.

In another aspect, a labeling method is shown and described herein. The labeling method may include receiving information at a first or writing side of a label. A protective cover of a laminae overlay may be removed to expose an adhesive portion of the laminae overlay. A laminating sheet and a label sheet may be folded at an alignment member such that the laminae overlay and the label are aligned. The label may adhere to the laminae overlay to form a laminated label. The laminate label may be removed from one or more liner sheets.

The following description and the drawings set forth certain illustrative aspects of the specification. The drawings indicate a few of the various embodiments that may utilize certain aspects of this disclosure. While some improvements and novel aspects may be specifically identified, others will be apparent from the detailed description.

DESCRIPTION OF THE DRAWINGS

The accompanying drawings illustrate various systems, apparatuses, devices and methods, in which like reference characters refer to like parts throughout, and in which.

DETAILED DESCRIPTION

Figure 1:
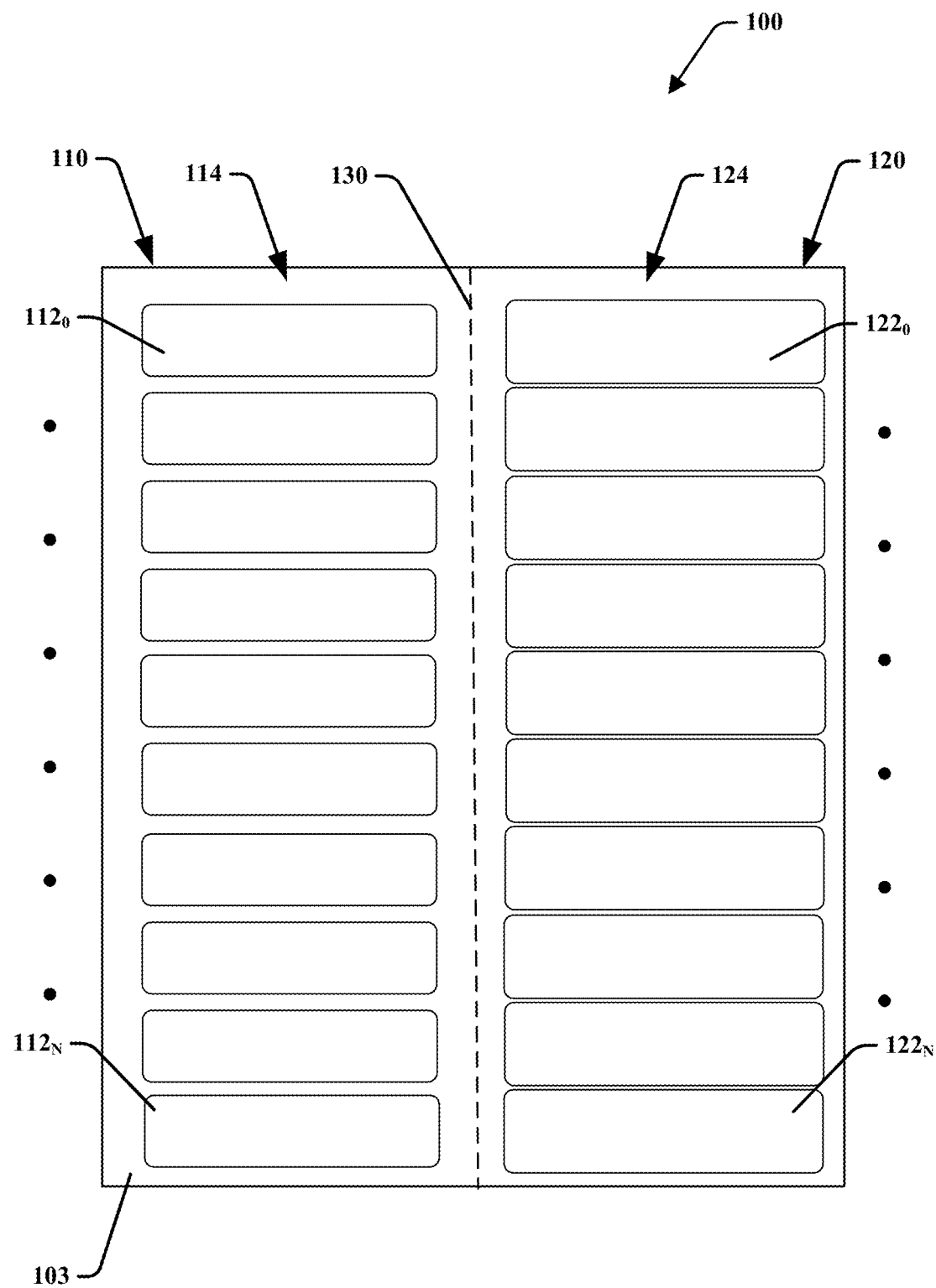
FIG. 1 is a front view of a laminating label assembly in accordance with various described embodiments.

Reference will now be made in detail to embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention. Further, unless context suggests otherwise, drawings depicted in this disclosure are not to scale. As such, the various embodiments may be of any desired size or dimensions.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used herein, the terms "carrier sheet", "liner sheet", "liner", "release sheet", or the likes are used interchangeably unless context warrants a particular distinction among such terms. For instance, the terms may refer to a sheet utilized as a means for supporting or carrying releasably adhered labels, laminae films, stickers, or other objects. Such terms may also refer to sheets made of paper, plastic, metal, or other material. Further, at least one side of such liner sheets may be coated. For example, a paper liner sheet may be coated with a silicone substance or the likes. Other coatings can include metallized foils, holographic film, and coatings for printing on films. Generally, the coating may allow for a releasably adhered label to be removed such that an adhesive is not degraded beyond a threshold (e.g., the adhered label may be adhered to another surface). In some embodiments, a liner sheet may include a plastic film (clear, opaque white, metallized, holographic or other), which may or may not be coated.

While labels, laminae overlays, sheets, and the like are described or depicted as having a particular shape, such elements may be of various shapes. The shapes may be generally rectangular, generally elliptical, generally triangular, irregular in shape, and the likes. Further, unless context suggest otherwise, descriptions of shapes (e.g., circular, rectangular, triangular, etc.) refer to meeting the definition of such shapes and general representation of such shapes. For instance, a triangular shape or generally triangular shape may include a shape that has three sides and three vertices or a shape that generally represents a triangle. Accordingly, it is noted that embodiments referencing a label or overlay are not limited by a particular type or design of the label or overlay. As such, it is noted that appropriate modifications may be made based on a desired label or overlay.

Various embodiments herein may refer to one or more components being cut or formed in a layer of material. Such embodiments may include die cut components or the likes. Unless otherwise specified or context suggest a particular distinction, a cut may be a through cut (e.g., through at least one layer of material), partial-through cut (e.g., through at least a portion of one layer of material), perforated cuts, or the likes.

Various assemblies or embodiments disclosed herein may be configured for use in printing devices, such as desktop printers, such as inkjet printers, laser printers, and the likes. For example, labels may be aligned such that a desktop printer may print onto a surface of the labels. In another aspect, embodiments may be configured for use in commercial printers. Moreover, while embodiments are generally described as label sheets, it is noted that embodiments may include rolled sheets or reams.

Laminating systems of this disclosure may be of any appropriate configuration and are not limited to those shown and described herein. It should be noted that the laminating systems may be adapted to include any number of labels, size of labels, shapes of labels, and the likes. Laminating label assemblies described herein may also be of various sizes, including, without limitation, 8.5 inches by 11 inches, 11 inches by 14 inches, 11 inches by 17 inches, A4 size, legal size or any other applicable size.

It is noted that the various embodiments described herein may include other components and/or functionality. However, some components or functionality that may be apparent may not be explicitly described for the sake of brevity. Such components and functionality are considered within the scope and spirit of the various embodiments described herein.

Aspects of systems, apparatuses or processes described herein generally relate to laminating label assemblies. In an embodiment, a laminating label assembly may include a label sheet and a laminating sheet. The label sheet and the laminating sheet may comprise distinct assemblies or may form a single assembly. For instance, the label sheet may comprise a liner sheet and a facestock sheet. The facestock sheet may comprise an adhesive side that is releasably adhered to the liner sheet (e.g., a coated side of the liner sheet). Labels may be cut or at least partially cut in the facestock sheet. The laminating sheet may also include a liner sheet, which may or may not be the same liner sheet as included in the label sheet, and a laminate film sheet. Similar to the facestock sheet, the laminate film sheet may comprise an adhesive side that is releasably adhered to the liner sheet of the laminating sheet. Likewise, laminae overlays may be cut into the laminate film sheet.

In another aspect, an alignment member may be disposed or formed in at least a portion of the laminating sheet or the label sheet. The alignment member may include a perforated line or the likes. In embodiments, the alignment member may align the laminating sheet and the label sheet, such that a label and a laminae overlay are aligned when the laminating label assembly is folded.

In an example, a user may write or print (e.g., via a printer system) onto a surface of a label. The user may then remove a protective cover from an adhesive side of a laminae overlay. The user may then fold the laminating sheet and/or the label sheet and press the exposed adhesive side of the laminae overlay to ensure sufficient contact with the label and/or to remove any air pockets or bubbles. Once the user is satisfied with the connection between the label and the laminae overlay, the user may remove the laminated label from the laminating label assembly. Said laminating label assembly and/or methods described herein may allow a user to easily align and laminate labels.

FIG. 1 is a front view of a laminating label assembly 100 in accordance with various described embodiments. It is noted that laminating label assembly 100 may include various other components or a different number of components. Furthermore, various embodiments of the laminating label assembly 100 may have different dimensions. In an aspect, laminating label assembly 100 may primarily include a label sheet 110 and a laminating sheet 120, which may be separated by an alignment member 130. In FIG. 1, a front side 114 of label sheet 110 and a front side 124 of laminating sheet 120 are depicted.

Label sheet 110 may comprise an array of labels, such as labels $112_0$-$112_N$, where N is a number. Likewise, laminating sheet 120 may comprise an array of laminae overlays, such as laminae overlays $122_0$-$122_N$. While label sheet 110 and laminating sheet 120 are respectively depicted as including ten labels and ten laminae overlays, it is noted that label sheet 110 and laminating sheet 120 may respectively include any number of labels or laminae overlays. Furthermore, label sheet 110 and laminating sheet 120 may include a different number of labels than laminae overlays. Likewise, while labels $112_0$-$112_N$ and laminae overlays $122_0$-$122_N$ are configured in single columns, it is noted that labels $112_0$-$112_N$ and/or laminae overlays $122_0$-$122_N$ may be arranged in rows, columns, staggered, random alignment, any combination of the above, or the likes. In embodiments, the configurations of labels $112_0$-$112_N$ and laminae overlays $122_0$-$122_N$ are mirrored with each other, such that labels $112_0$-$112_N$ and laminae overlays $122_0$-$122_N$ are aligned when laminating sheet 120 and label sheet 110 are folded.

In an embodiment, labels $112_0$-$112_N$ and laminae overlays $122_0$-$122_N$ may comprise generally rectangular shapes. In other embodiments, labels $112_0$-$112_N$ and laminae overlays $122_0$-$122_N$ may include various shapes, which may or may not match. Such shapes may include ellipses, circles, squares, i-sided polygons, irregular shapes, stars, hearts, or the likes. Furthermore, such shapes may be solid or may include cutouts or holes within such shapes. For example, labels $112_0$-$112_N$ and laminae overlays $122_0$-$122_N$ may comprise circular shapes having a circular hole or cutout near or around a center of the circular shape, such as the shape of a compact disk. It is noted that embodiments comprising various other shapes are considered within the scope of this disclosure.

In an aspect, some or all labels $112_0$-$112_N$ may be surrounded or framed by a matrix 103. Matrix 103 may comprise a matrix of waste or excess label material, such as label material remaining after the array of labels are cut or formed. In at least one embodiment, all or part of matrix 103 may be removed from label sheet 110. Matrix 103 may be removed such that label sheet 110 includes labels $112_0$-$112_N$ adhered to a liner and the liner is exposed or viewable in areas previously occupied by matrix 103. For example, matrix 103 may be removed to alter (e.g., improve) alignment of labels $112_0$-$112_N$ and laminae overlays $122_0$-$122_N$, alter (e.g., increase) compatibility of laminating label assembly 100 with a printing device, or the likes. It is noted that matrix 103 may be removed by an automated device, by a user, or by other means. While various embodiments may refer to matrix 103 or removing matrix 103, it is noted that labels $112_0$-$112_N$ may be deposited on label sheet 110 without matrix 103, such that matrix 103 is not present and therefor is not removed. Removal of the matrix 103 may increase compatibility with various printing devices, such as desktop printers. In an aspect, removal of the matrix 103 may decrease thickness of assembly 100, decrease slippage in a printing device, increase visibility of labels $112_0$-$112_N$ (e.g., help user identify and distinguish labels), increase removability of labels $112_0$-$112_N$ (e.g., help users remove a label from a label sheet), or the likes.

Figure 2:
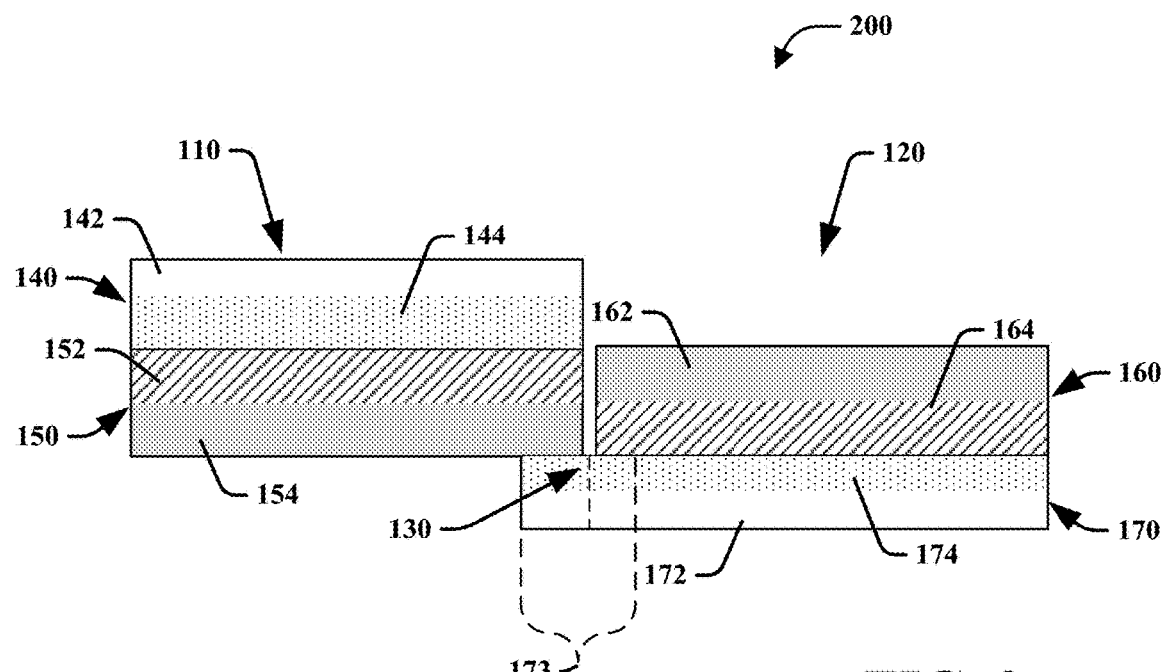
FIG. 2 is a cross-sectional view of a laminating label assembly in accordance with various described embodiments.
Figure 3:
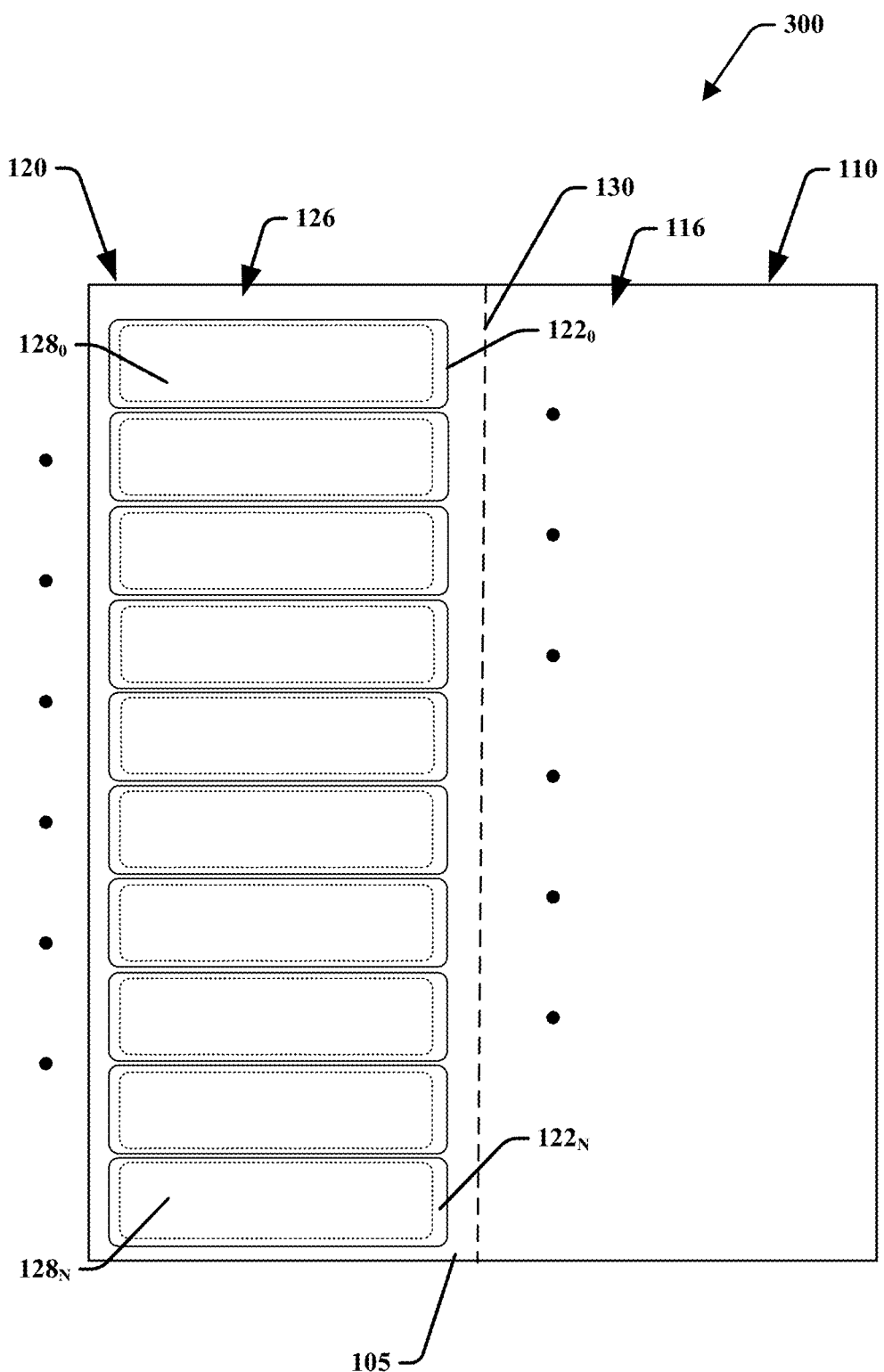
FIG. 3 is a back view of a laminating label assembly in accordance with various described embodiments.

Turning to FIGS. 2 and 3, with reference to FIG. 1, depicted are further aspects of an embodiment of laminating label assembly 100. FIG. 2 is a cross-sectional view 200 of laminating label assembly 100. FIG. 3 is a backside view 300 of laminating label assembly 100. It is noted that cross-sectional view 200 is not drawn to scale. Furthermore, cross-sectional view 200 may include a different number of layers of components.

Label sheet 110 may include a facestock layer 140 that is at least partially releasably adhered to a liner sheet or liner layer 150. Facestock layer 140 may include a first side 142 that may be configured for receiving a writing medium, such as ink, graphite, lead, wax (e.g., crayon), paint, or the like. The first side 142 of facestock layer 140 is shown in FIG. 1 as front side 114 of label sheet 110. A second side 144 of facestock layer 140 may comprise an adhesive substance or coating, which may include a permanent adhesive or a removable adhesive. In other embodiments, second side 144 may not have an adhesive coating. In embodiments, where second side 144 has an adhesive coting, second side 144 may be releasably adhered to a liner layer 150. It is noted that liner layer 150 may include a coated side 152 and a non-coated side 154 that may serve as backside 116 of label sheet 110. While described as a coated and a non-coated side, it is noted that the sides may or may not be coated. However, for sake of brevity, such sides are referred to as coated and/or non-coated. It is further noted that the coating may comprise a wax, silicone, or other substance that allows for a releasable connection with an adhesive.

Laminating sheet 120 may include a liner layer 160 and a laminae layer 170. Liner layer 160 may include a coated side 164 and a non-coated side 162 (e.g., non-coated side 162 shown in FIG. 1 as front side 124 of laminating sheet 120). Laminae layer 170 may include an adhesive side 174 and a non-adhesive side 172 (e.g. non-adhesive side 172, shown in FIG. 2 as backside 126 of laminating sheet 120). In an aspect, laminae layer 170 may comprise an at least partially clear or opaque laminae film.

As depicted in FIG. 1, labels $112_0$-$112_N$ may be at least partially cut into facestock layer 140. In another aspect, protective liners $128_0$-$128_N$ may be cut into liner layer 160 of laminating sheet 120. Likewise, laminae overlays $122_0$-$122_N$ may be cut into laminae layer 170. For instance, a die-cutting machine or other apparatus may pre-form labels $112_0$-$112_N$, protective liners $128_0$-$128_N$ and/or laminae overlays $122_0$-$122_N$ into facestock layer 140, liner layer 160 and laminae layer 170, respectively.

In an aspect, FIG. 1 may depict laminating label assembly 100 with protective liners $128_0$-$128_N$ removed, such that at least a portion of adhesive layer 174 is exposed. However, backside view 300 depicts protective liners $128_0$-$128_N$ (dotted lines) and laminae overlays $122_0$-$122_N$, wherein protective liners $128_0$-$128_N$ are adhered to laminae overlays $122_0$-$122_N$. In an aspect, protective liners $128_0$-$128_N$ may be smaller in length and/or width than laminae overlays $122_0$-$122_N$, such that protective liners $128_0$-$128_N$ are framed by laminae overlays $122_0$-$122_N$.

In an aspect, some or all laminae overlays $122_0$-$122_N$ may be surrounded or framed by a matrix 105. Matrix 105 may comprise a matrix of waste or excess laminae material, such as laminae material remaining after laminae overlays $122_0$-$122_N$ are cut or formed. In at least one embodiment, all or part of matrix 105 may be removed from laminating sheet 120. For example, matrix 103 may be removed to alter (e.g., improve) alignment of labels $112_0$-$112_N$ and laminae overlays $122_0$-$122_N$, alter (e.g., increase) compatibility of laminating label assembly 100 with a printing device, or the likes. It is noted that matrix 105 may be removed by an automated device, by a user, or by other means. While various embodiments may refer to matrix 105, matrix 103, or removing matrix 105/103, it is noted that laminae overlays $122_0$-$122_N$ may be deposited on laminating sheet 120 without matrix 105, such that matrix 105 is not present and therefor is not removed. In various embodiments matrix 103 and/or matrix 105 may be removed or otherwise not present. It is noted that in some embodiments, a portion of matrix 105 be removed. For instance, a portion 173, as shown in FIG. 2, of matrix 105 may be left to ensure laminating sheet 120 is attached to label sheet 110.

According to embodiments, label sheet 110 and laminating sheet 120 may be coupled together or integrally formed. For instance, as seen in FIG. 2, laminae layer 170 may at least partially adhere to liner layer 150 of label sheet 110.

In an aspect, alignment member 130 may include a gap or separation between label sheet 110 and laminating sheet 120, such as from removing matrix 103 and/or matrix 105 or from a difference in thicknesses between label sheet 110 and laminating sheet 120. In another aspect, an exposed portion of adhesive side 174 (e.g., area above and/or comprised by alignment member 130) may be prevented from accidently adhering to surfaces due to thicknesses of liner layer 160, liner layer 150 and/or facestock layer 140. Alignment member 130 may also comprise a perforated line through laminae layer 170. It is noted that in other embodiments, alignment member 130 may include one or more components that increase flexibility of laminae layer 170 at alignment member 130. For instance, laminating label assembly 100 may be pre-folded such that laminae layer 170 is made more flexible at alignment member 130 relative to other areas of laminae layer 170.

Alignment member 130 may include various functions or elements that may assist a user in folding laminating label assembly 100, aligning a label and laminae overlay, or the likes. In embodiments, alignment member 130 may include a gap or spacing separating the label sheet 110 and the laminating sheet 120, as depicted in FIG. 2. In an aspect, the label sheet 110 and the laminating sheet 120 may be a threshold distance from each other, such as one sixteenth of an inch or the likes. In some embodiments, the distance is small enough to prevent an exposed portion of laminae layer 170 from sticking or adhering to surfaces or objects when label sheet 110. Further, the distance may be based, at least in part, on dimensions of labels and laminae overlays, such that laminating label assembly 100 can be utilized by a printer device and labels may be printed on.

In at least one embodiment, alignment member 130 may include a perforated line. The perforated line may include perforations formed in or through at least one layer of laminating label assembly 100. In an aspect, a perforated line may weaken a portion of laminating label assembly such that it is easier to fold. Furthermore, alignment member 130 may include one or more notches formed in the laminating label assembly 100. A notch may include a weakened portion of laminating label assembly 100. The portion may be weakened through cutting, imprinting, or otherwise altering the laminating label assembly 100. In an example, alignment member 130 may include a first triangular notch at or near a top edge of laminating label assembly 100 and having a vertex aligned with the dashed line of FIG. 1. A second triangular notch may be disposed at or near a bottom edge of laminating label assembly 100 with a vertex aligned with the dashed line of FIG. 1. As such, a user may fold the laminating label assembly 100 with aide of the first and second notch. It is noted that a different number of notches and/or shapes may be utilized.

In another aspect, alignment member 130 may include indicia. The indicia may be visual or tactile indicia that indicate where a user should fold the laminating label assembly. As an example, the indicia may be a line or dotted line printed at a determined fold line. It is noted that an embodiment of alignment member 130 may include any combination of aspects or embodiments described herein.

In another embodiment, label sheet 110 and laminating sheet 120 may comprise one or more common layers or sheets. For instance, label sheet 110 and laminating sheet 120 may comprise a common liner sheet. Likewise, laminae layer 170 or facestock layer 140 may at least partially overlap laminating sheet 120 and/or label sheet 110, respectively. In an example, liner layer 150 and liner layer 160 may be comprised of a single liner sheet. It is noted that the single liner sheet may be at least partially coated on one or more sides. Alignment member 130 may include a perforated line through the common liner sheet.

Figure 14:
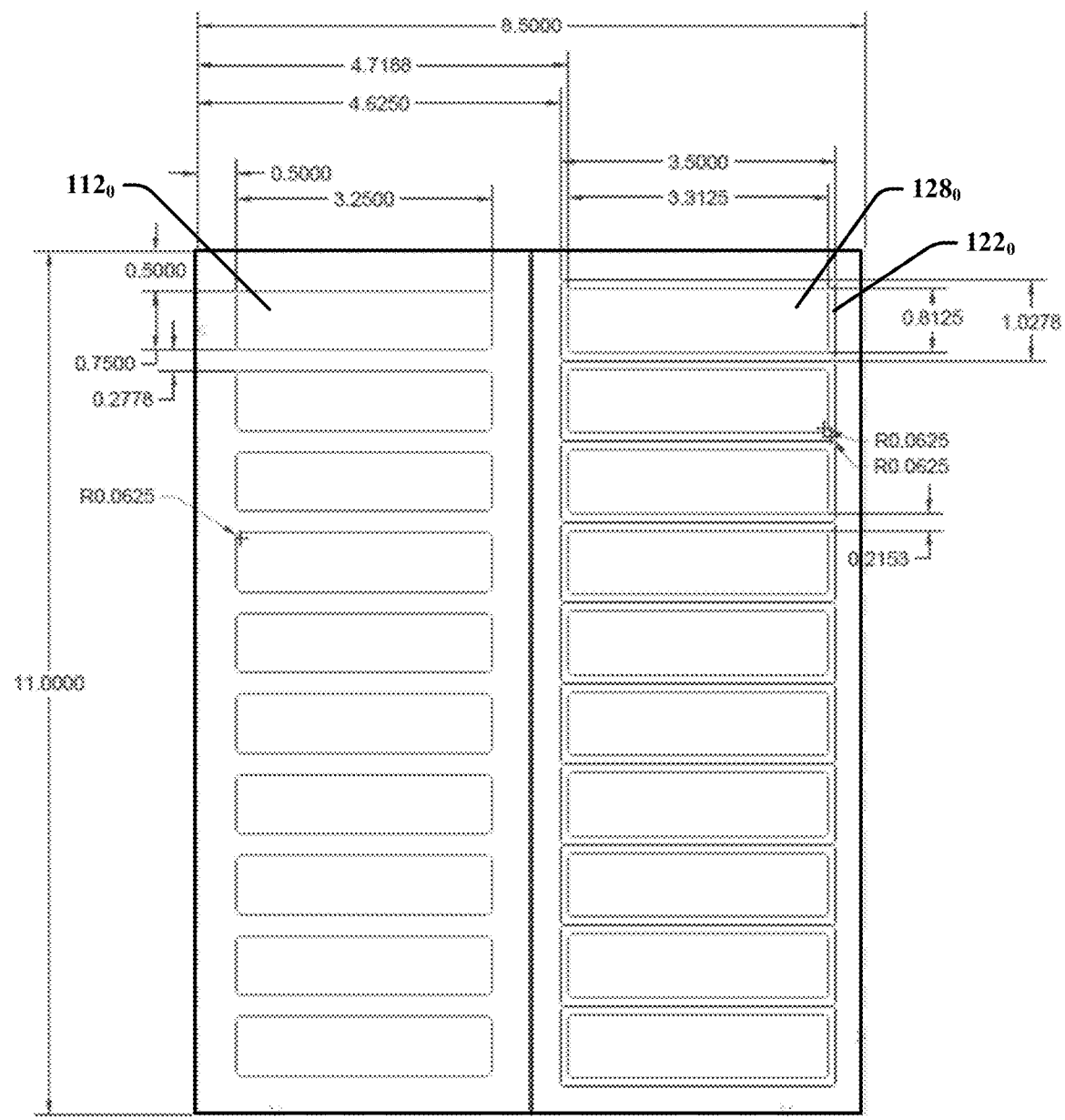
FIG. 14 is a front view of a laminating label assembly including example dimensions in accordance with various described embodiments.

Turning now to FIG. 14, there depicted is an exemplary embodiment of laminating label assembly 100. FIG. 14 depicts various measurements (e.g., in inches) for an 11 by 8.5 inch laminating label assembly. In at least one embodiment, each label may be 0.75 inches by 3.25 inches. Label $112_O$ may be disposed 0.5 inches from a top edge of laminating label assembly 100 and 0.5 inches from a left edge of laminating label assembly 100. Each label may be a distance of about 0.28 inches or, more specifically, 0.2778 inches from each other. Laminae overlay $122_O$ may be about 3.5 inches by 1.03, or 1.0278, inches. Protective liner $128_O$ may be about 3.3125 inches by about 0.8125 inches. In another aspect, each protective liner may be a distance of 0.2153 inches away from each other. The above measurements have been provided by way of an example only. While depicted as specific measurements, the numerical values are provided to depict one of many possible embodiments. Here as well as elsewhere in this disclosure, the measurements are not necessarily preferred over any other measurements. It is noted that such measurements may be different based on desired configurations, particular applications, numbers of labels, printer settings, or the likes.

For instance, in at least one embodiment, a label may be larger than a laminae overlay. In such an embodiment, the label may be partially laminated by the laminae overlay. In another embodiment, a label and a laminae overlay may comprise different shapes or dimensions than shown in FIG. 1, such that a label is partially laminated. For example, label $112_O$ may be substantially rectangular and may be about 3.25 inches wide, while laminae overlay $128_O$ may be substantially rectangular and may be about 3 inches wide. Thus, when the laminae overlay is adhered to the label, a portion of the label will not be laminated.

Figure 2A:
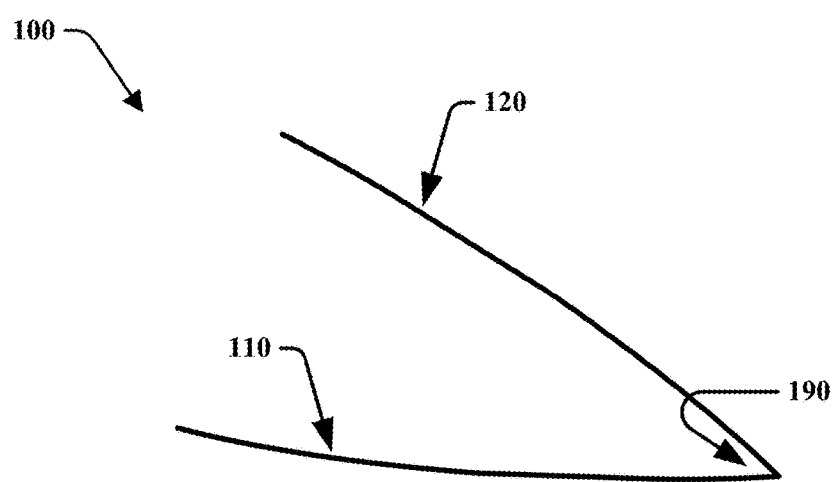
FIG. 2A is a bottom plane view of a laminating label assembly in a folded configuration in accordance with various described embodiments.

Turning to FIG. 2A, there depicted is a bottom plane view of laminating label assembly 100 in an at-rest-folded orientations. For example, laminating label assembly 100 may be placed on a flat surface, such as a table. Laminating label assembly 100 may then be folded at the alignment member 130, such that laminating sheet 120 is folded over to label sheet 110. In some embodiments, a user may crease the folded assembly by applying pressure at or near a fold line. When the laminating label assembly 100 is released by the user, the laminating sheet 120 may come to an equilibrium position as seen in FIG. 2A. The equilibrium position may be a position where the restorative force of the laminating label assembly 100 and a resisting force (e.g., gravity, etc.) are substantially balanced such that laminating sheet 120 is substantially at rest for a period of time. It is noted that the laminating label assembly 100 may return to a substantially flat or planar orientation if given enough time to rest.

In an aspect, an angle 190 may be associated with the equilibrium position. In at least one embodiment, the angle 190 may be about 15 degrees to about 60 degrees. In one embodiment, the angle 190 may be about 45 degrees. The angle 190 may depend on the strength of one or more materials of the laminating label assembly 100. For example, laminae layer 170 may comprise a material that has a level of flexibility to allow folding and also a level of resilience to generate a restorative force. It is noted that the angle 190 may contribute to reduction in air pockets, reduction in wrinkles, ease of alignment, and the likes. For instance, an angle 190 between about 15 degrees to about 60 degrees may contribute to reduced air pocket formation and an increased ease of alignment. As an example, an angle smaller than about 15 degrees may result in a laminae overlay inadvertently adhering to a label or other portion of label sheet 110 when a user folds the laminating label assembly 100. The inadvertent adhering may result in a bubble or wrinkle. Further, the inadvertent adhering may result in improper alignment. In another example, an angle greater than 60 degrees may result in air pockets, wrinkles, or increased difficulty in alignment. It is noted that other angles are certainly possible and considered within the scope and spirit of this disclosure. While FIG. 2A illustrates laminating sheet 120 and label sheet 110 comprising a curve, it is noted that the magnitude of the curve may be different and/or the sheets may not be curved. In an aspect, the curve may be based on the weight of the sheets, the stiffness or pliability of the sheets, and the likes.

Aspects of laminating label assemblies are described with reference to FIGS. 4-9. It is noted that the various embodiments of FIGS. 4-9 may include similar components and/or functionality. Furthermore, like named components are intended to include all aspects and functionality as described above unless context suggests otherwise or warrants a particular distinction among such components. Moreover, acts or processes shown and/or described with reference to FIGS. 4-9, may occur in different orders and/or concurrently with other acts. Moreover, different actions may be utilized to implement methods described hereinafter. Various actions may be completed by one or more of users, mechanical machines, automated assembly machines (e.g., including one or more processors or computing devices), or the like.

Figure 4:
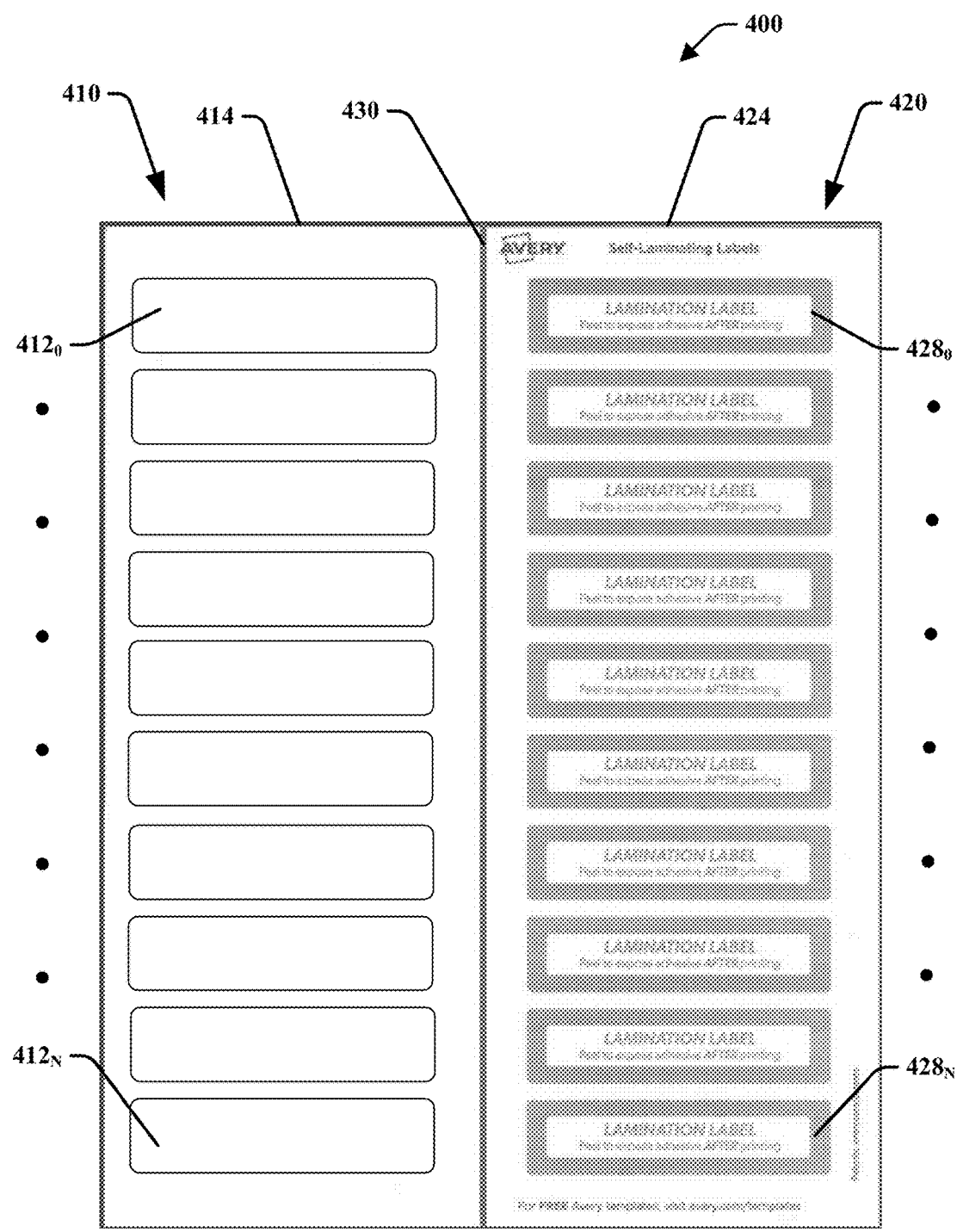
FIG. 4 is a front view of a laminating label assembly including printed information in accordance with various described embodiments.

FIG. 4 is a front side view of a laminating label assembly 400 in accordance with one or more aspects of this disclosure. As shown, laminating label assembly 400 may include labels $412_O$-$412_N$ and protective liners $428_O$-$428_N$. Alignment member 430 may be disposed within one or more layers (or sheets) or laminating label assembly 400. In another aspect, alignment member 430 may be disposed in a position to align one or more labels $412_O$-$412_N$ with one or more laminae overlays (not shown in FIG. 4) when label sheet 410 is folded with respect to laminating sheet 420 and one or more protective liners $428_O$-$428_N$ are removed. In an aspect, folding label sheet 410 and/or laminating sheet 420, may comprise manipulating laminating label assembly 400 such that at least a portion of front side 414 of label sheet 410 meets or contacts with front side 424 of laminating sheet 420.

In at least one embodiment, front side 424 (e.g., including protective liners $428_O$-$428_N$) may comprise information printed or otherwise disposed on a surface. The information may include instructions, indicia, or the likes. Labels $412_O$-$412_N$ may be black or white, such that ink or another writing medium may be deposited on their surfaces. In other embodiments, labels $412_O$-$412_N$ may include information such as designs, instructions, colors, indicia, or the likes.

Figure 5:
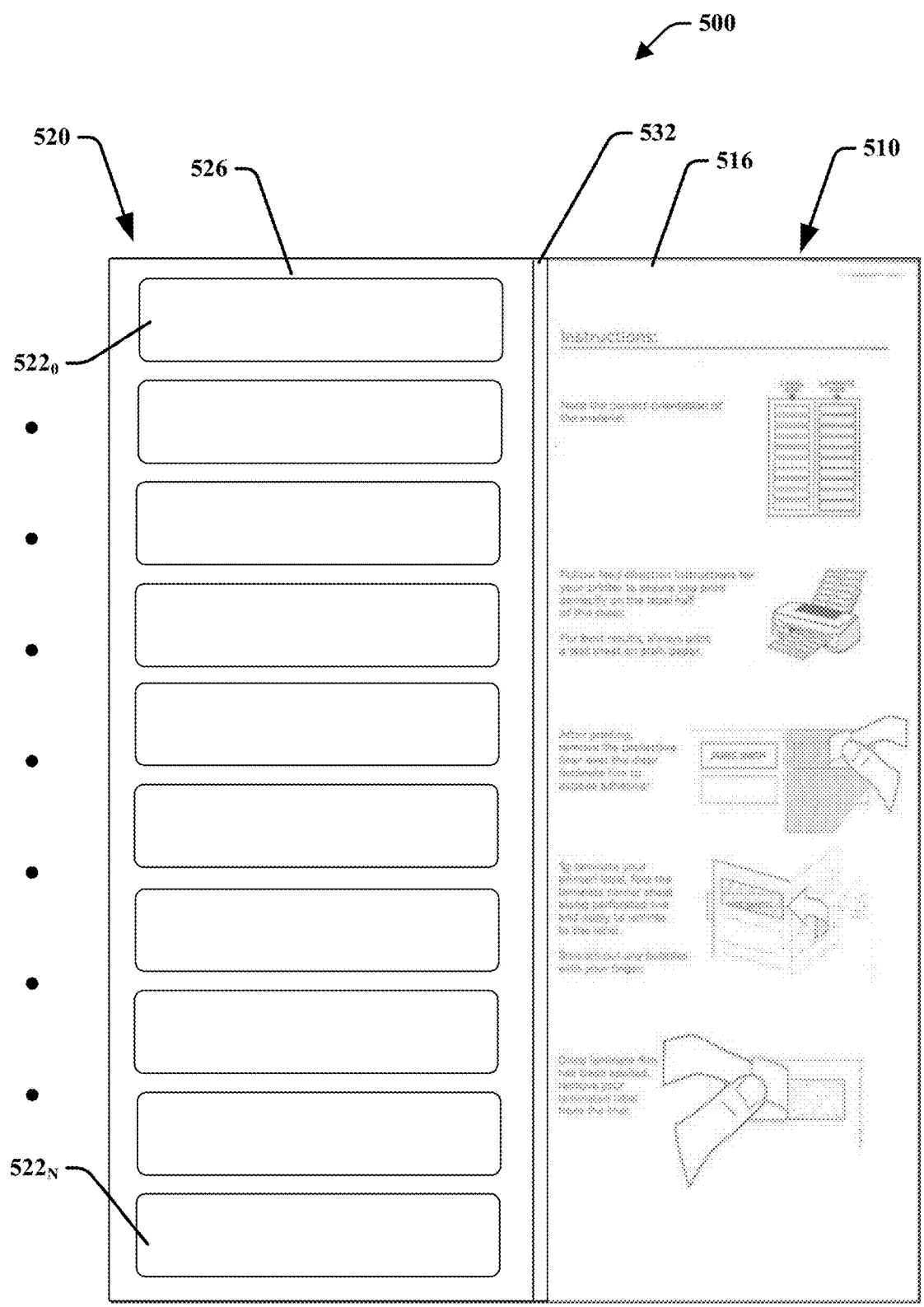
FIG. 5 is a back view of a laminating label assembly including printed information in accordance with various described embodiments.

FIG. 5 is a backside view of a laminating label assembly 500. Laminating label assembly 500 primarily includes label sheet 510 and laminating sheet 520. As illustrated, a backside 516 of label sheet 510 may include printed information. The information may include instructions, such as text and/or illustrations. The instructions may provide a user with a step-by-step guide related to proper or preferred use of laminating label assembly 500. Laminating sheet 520 may include backside 526 that may also include one or more laminae overlays $522_O$-$522_N$. Laminae overlays $522_O$-$522_N$ may be disposed within a laminae film or layer (e.g., laminae layer 170).

As depicted, backside 526 may be at least partially adhered or connected to label sheet 510. For instance, portion 532 of backside 526 may comprise a laminae film that is adhered to backside 516 of label sheet 510. In an aspect, portion 532 may comprise some or all of an alignment member and/or may be perforated as described in various embodiments.

Figure 6:
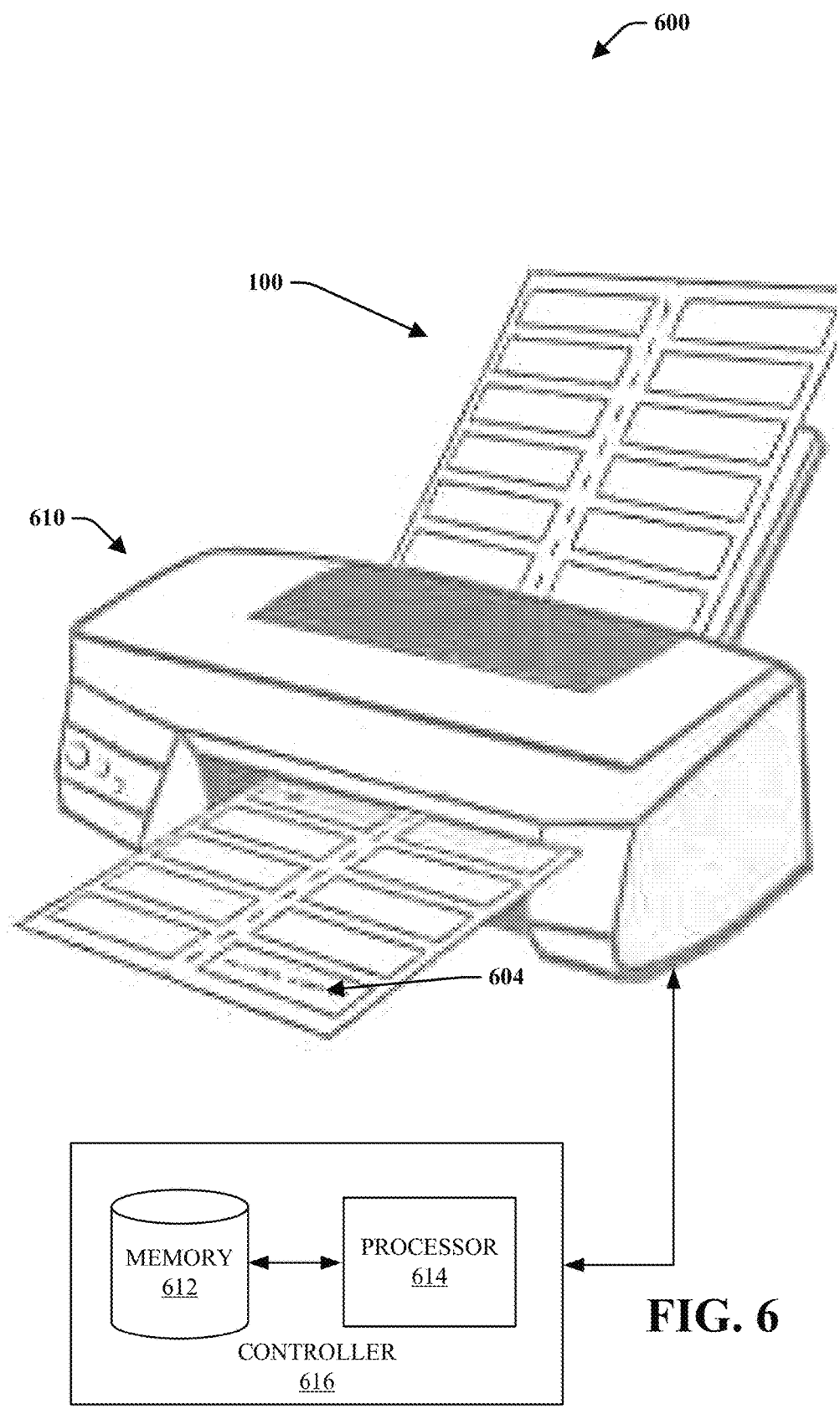
FIG. 6 is a plan view of a labeling system including a printer system in accordance with various described embodiments.

FIG. 6 is a laminating system 600 configured for printing information on one or more labels. Laminating system 600 may primarily include printer system 610, controller 616, and laminating label assembly(ies) 100. In an aspect, printer system 610 may be of various makes and/or models, such as inkjet printers, laser printers, and the likes. Accordingly, printer system 610 is provided for illustrative purposes and is not considered limiting on or to embodiments described herein.

In an aspect, controller 616 may include a memory 612, for storing computer executable components, and a processor 614 that may facilitate operation of the computer executable components. Controller 616 may be at least partially comprised within printer system 610 and/or may be at least partially comprised in another system, such as a desktop computer, laptop computer, smart phone, tablet computer, or the likes. In some embodiments, memory 612 may comprise a template component that may facilitate proper alignment and/or positioning of text 604 when text is printed on a laminating label assembly 100. For example, a user may utilize a computer to provide information regarding contents to be printed on a label. After providing the information, the computer (e.g., including the controller 616) may instruct the printer system 610 to print the information onto laminating label assembly 100 that is provided in a feed tray of printer system 610 or otherwise fed to printer system 610.

Figure 7:
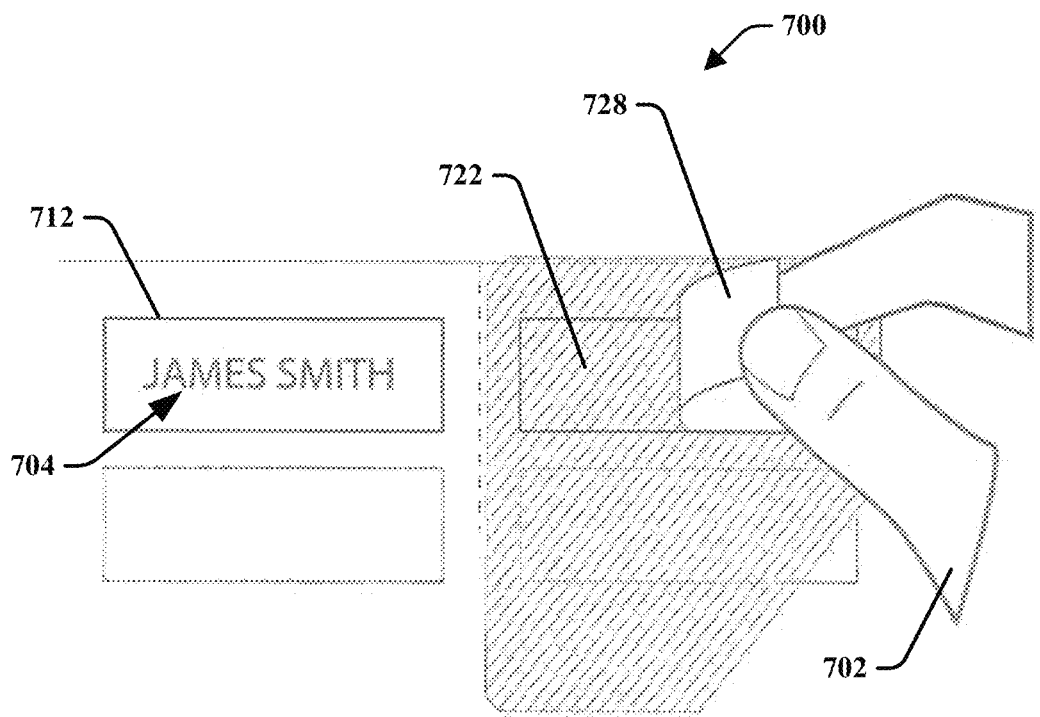
FIG. 7 is a plan view of a labeling system including a protective cover in accordance with various described embodiments.

FIG. 7 is a laminating label system 700 in accordance with one or more described aspects. A label 712 of laminating label assembly 700 may comprise printed information 704 (e.g., "JAMES SMITH" in FIG. 7). The printed information may be deposited via a printer system (e.g., printer system 610) or other means, such as via a pen. After depositing the information 704 on label 712, a user 702 may remove a protective layer 728 to expose an adhesive side of a laminae overlay 722.

Figure 8:
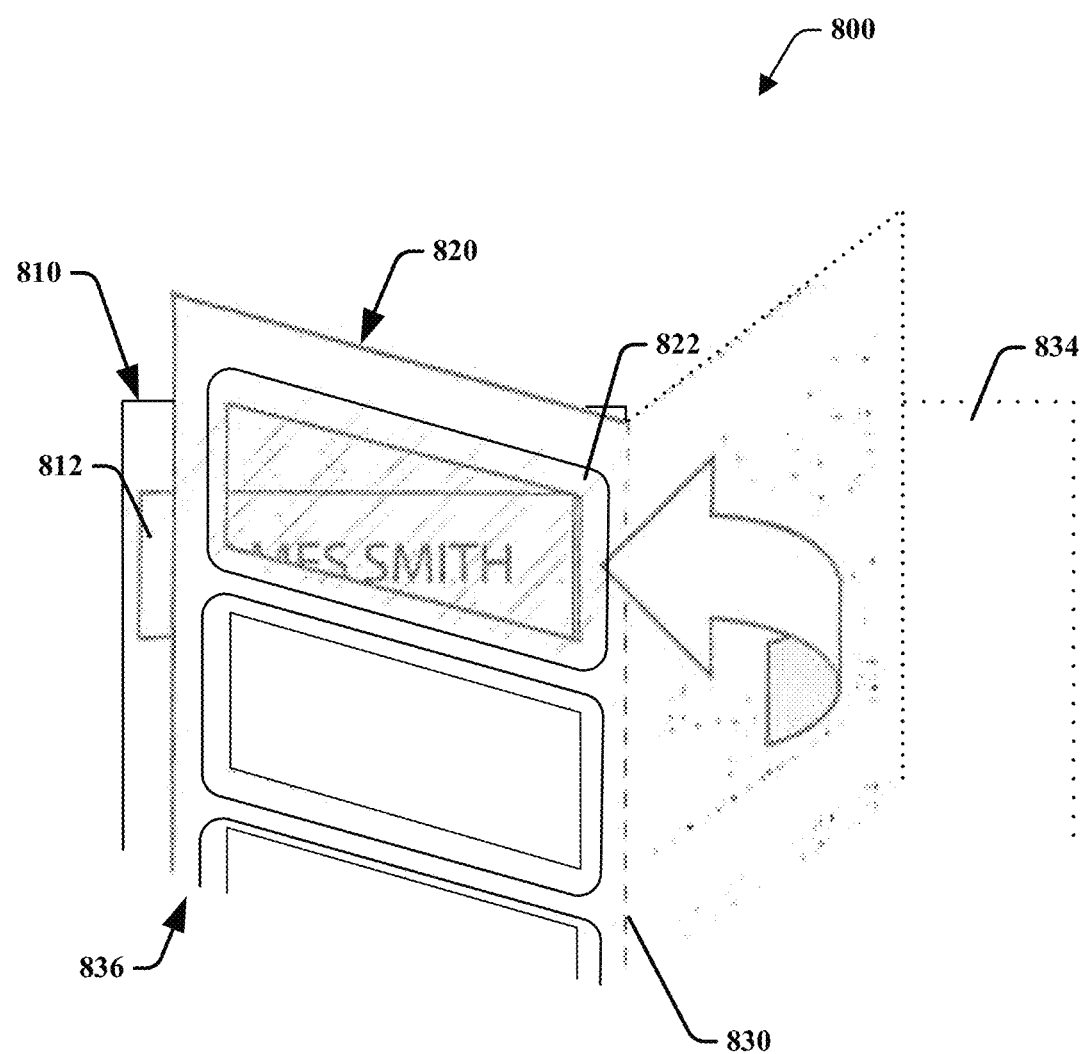
FIG. 8 is a plan view of a labeling system including a laminae overlay in accordance with various described embodiments.

FIG. 8 is a laminating label system 800 in accordance with one or more described aspects. In an aspect, laminating label assembly 800 is depicted as being folded at alignment member 830. Laminating sheet 820 is depicted as displaced from an initial position 834 to position 836. At position 836, an adhesive side (e.g., adhesive side 174 of FIG. 2) of laminae overlay 822 is proximal to label 812. Alignment member 830 is positioned such that label 812 and laminae overlay 822 are aligned when laminating label assembly 800 is folded at alignment member 830. It is noted that laminae overlay 822 may have a larger area than a protective cover (e.g., protective cover 728).

As laminating sheet 820 contacts label sheet 810, an exposed adhesive portion (e.g., adhesive side 174) of laminae overlay 822 may contact at least a portion of label 812 (e.g., first side 142). In an aspect, the exposed adhesive portion of laminae overlay 822 may completely cover or overlay a surface of the label 812. Once contacted and/or during contacting of label 812 and laminae overlay 822, a user may press laminating sheet 820 and label sheet 810 together to ensure an acceptable connection has been made. In an aspect, the user may also press laminating sheet 820 and label sheet 810 together to remove air bubbles that may be trapped between laminating sheet 820 and label sheet 810 together.

As shown in FIG. 8, the label sheet 810 and laminating sheet 820 may be folded to reduce or eliminate formation of air pockets or bubbles resulting from adhering label 812 and laminae overlay 822. In an example, a user may fold laminae overlay 822 onto label sheet 810 (or vise versa). As the user folds the laminating sheet 820, the laminae overlay 822 contacts a portion of the label sheet 820 nearest to the alignment member 830. The user may then press or provide pressure to the laminating sheet 820 to help reduce possible air pockets.

Figure 9:
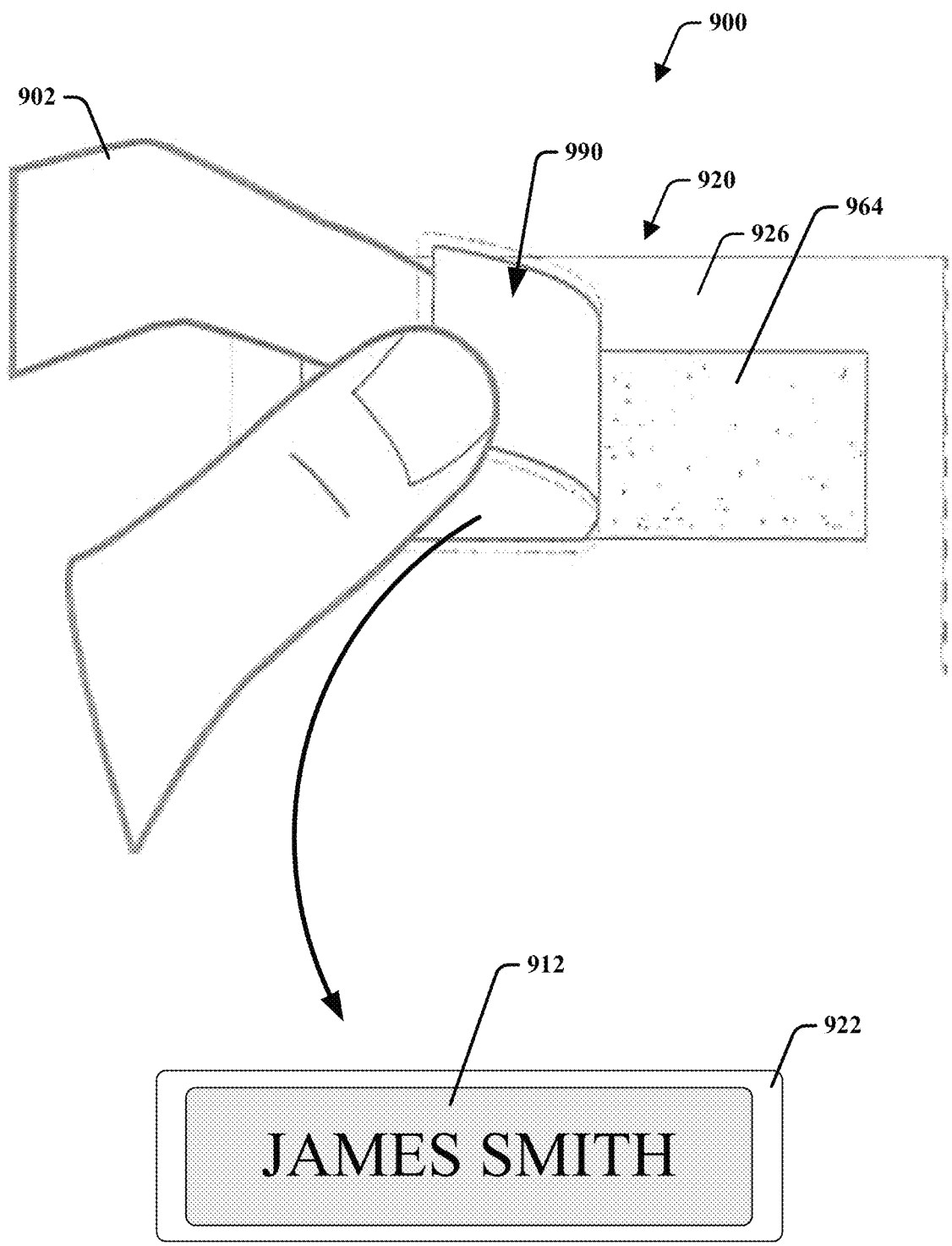
FIG. 9 is a plan view of a labeling system including a laminated label in accordance with various described embodiments.

FIG. 9 is a laminating label system 900 in accordance with one or more described aspects. Laminating label assembly 900 is depicted as having label 912 adhered to laminae overlay 922. In an aspect, a laminating sheet 920 may be folded onto a label sheet (as shown in FIG. 8).

Furthermore, a user 902 may remove or peel the label 912 that is adhered to laminae overlay 922 from a backside 926 of a laminating sheet 920. In an aspect, if the user removes the laminae overlay 922, the label 912 may also be removed due to the adhesive connection between the laminae overlay 922 and the label 912. For instance, a bond or connection between the laminae overlay 922 and the label 912 may be stronger than a bond between the label 912 and a liner sheet 964 (e.g., a coated surface of a liner sheet).

In another aspect, at least a portion of laminae overlay 922 may frame or extend past label 912. As such, an adhesive side of laminae overlay 922 may be adhered to a desired surface (e.g., a piece of paper, a folder, etc.). In an aspect, label 912 may or may not comprise an adhesive side. For example, the portion of laminae overlay 922 which frames label 912 may comprise sufficient surface area and/or cohesive strength such that label 912 need not have an adhesive side.

Figure 10:
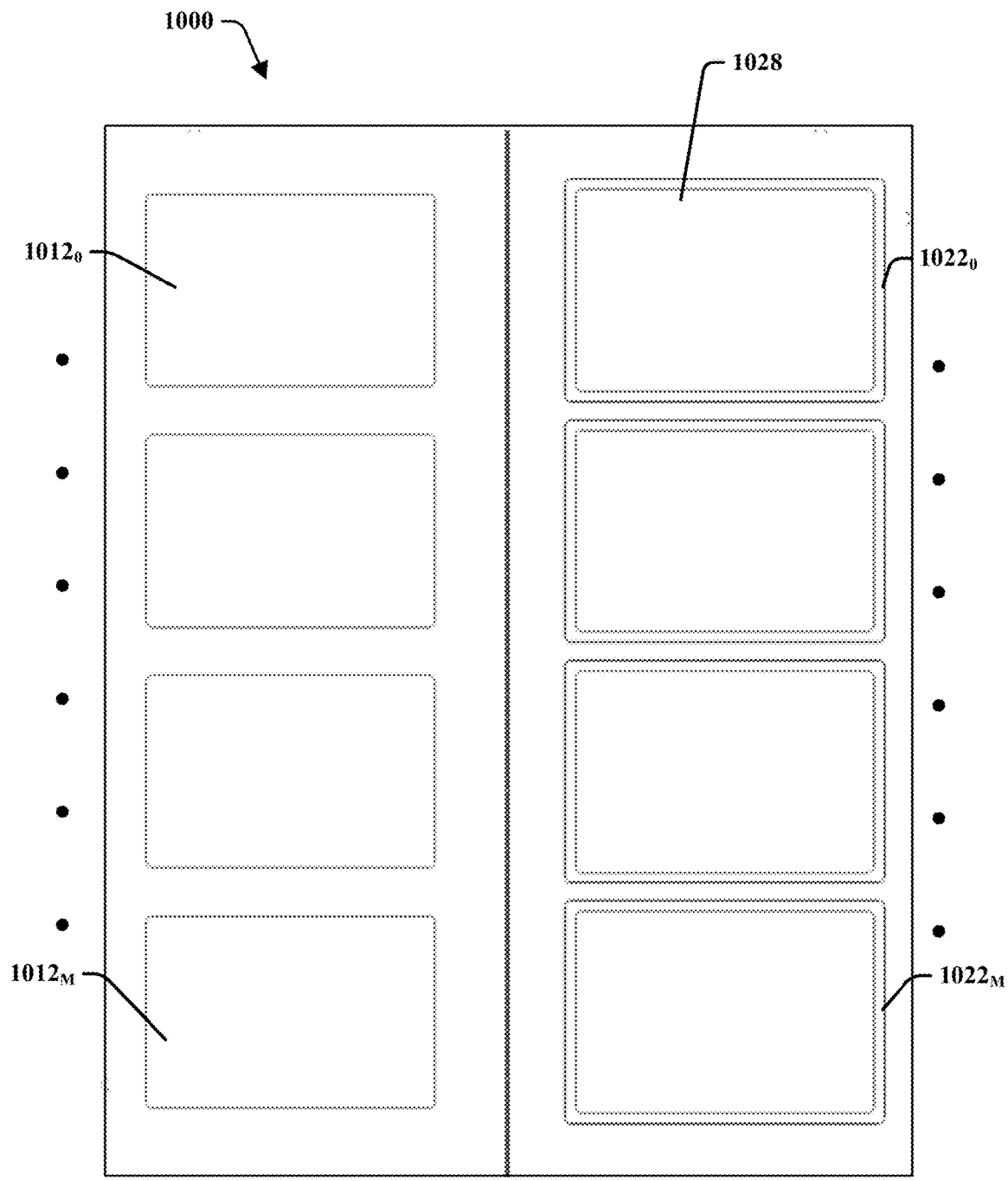
FIG. 10 is a front view of a laminating label assembly including four labels and four laminae overlays in accordance with various described embodiments.

FIG. 10 is a front view of a laminating label assembly 1000 including labels ($1012_0$-$1012_M$, where M is a number) and laminae overlays ($1022_0$-$1022_M$) in accordance with various described embodiments. As depicted, M may equal four. It is noted that labels $1012_0$-$1012_M$ may be the same or different sizes than various other labels described herein (e.g., labels $112_0$-$112_N$). In another aspect, protective liner 1028 may be removed to expose an adhesive side of laminae overlay $1022_0$.

In at least one example, labels $1012_0$-$1012_M$ may be about two inches by about three inches. Laminae overlays $1022_0$-$1022_M$ may be larger than labels $1012_0$-$1012_M$, so as to overlap said labels. For instance, laminae overlays $1022_0$-$1022_M$ may be greater than about two inches by greater than about three inches, such as 2.3 inches by 3.3 inches. Furthermore, protective liner 1028 may be about or greater than two inches by about or greater than three inches. In other words, protective liner 1028 may be between about the same size as label $1012_0$ and about the same size as laminae overlays $1022_0$.

It is noted that the above exemplary dimensions are one of many embodiments. As such, various components of described embodiments may be of various sizes. Furthermore, the various components may be of different relative sizes (e.g., labels may be larger than laminae overlays, etc.).

Figure 11:
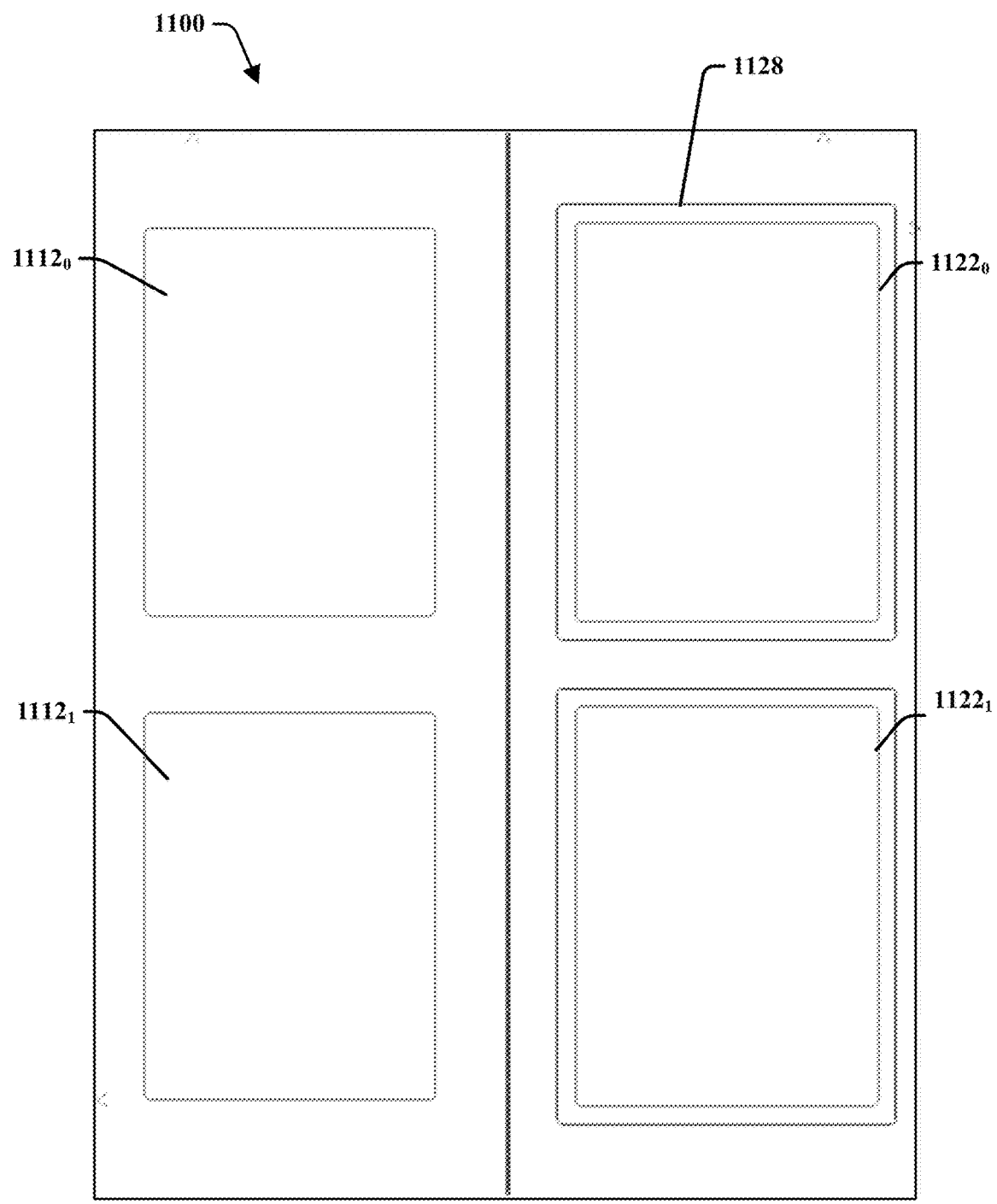
FIG. 11 is a front view of a laminating label assembly including two labels and two laminae overlays in accordance with various described embodiments.

FIG. 11 is a front view of a laminating label assembly 1100 including labels $1112_0$ and $1112_1$ and protective liners $1122_0$ and $1122_1$ in accordance with various described embodiments. In another aspect, protective liner $1122_0$ may be removed to expose an adhesive side of laminae overlay 1128.

Figure 12:
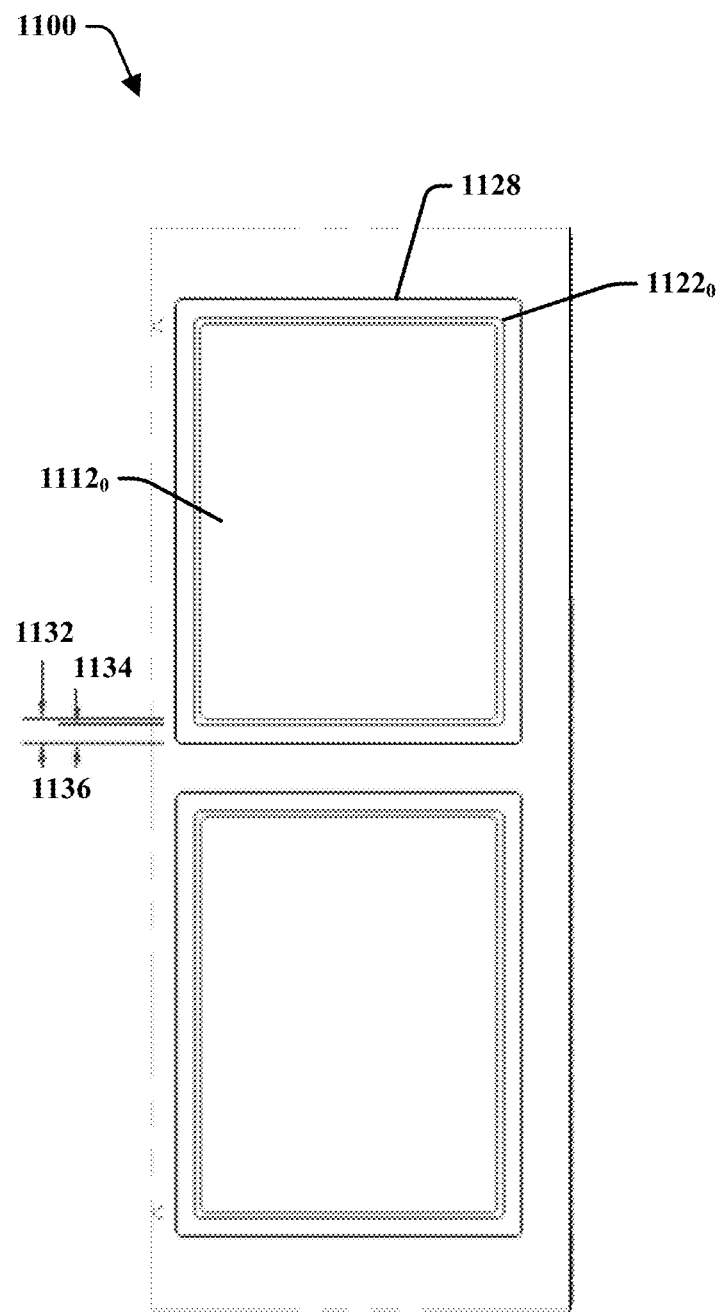
FIG. 12 is a front view of a laminating label assembly including two labels and two laminae overlays in a folded configuration in accordance with various described embodiments.

FIG. 12 is a front view of laminating label assembly 1100 including two in a folded configuration in accordance various aspects described herein. For example, a user may fold laminating label assembly 1100 via an alignment member or the likes. As shown, protective liner $1122_0$ may be larger (e.g., in area) than label $1112_0$ and laminae overlay 1128 may be larger (e.g., in area) than protective liner $1122_0$. Reference line 1134 may represent an edge of protective liner $1122_0$, which may be a distance from reference line 1132 that may represent and edge of label 11120. Likewise, reference line 1136 may represent an edge of laminae overlay 1128. It is noted that such an arrangement may be utilized by various described embodiments. However, other embodiments may utilize different arrangements, such as a laminae overlay of substantially equal area and dimension as a label.

In at least one example, laminae overlay 1128 may be a smaller size than label $1112_0$. Thus, when folded or adhered together, a portion of label $1112_0$ may be exposed. For example, the exposed portion may not be covered by laminae overlay 1128. In another aspect, laminae overlay 1128 may comprise one or more removable portions that a user may optionally remove such that a portion of label $1112_0$ is not covered by laminae overlay 1128.

Figure 13:
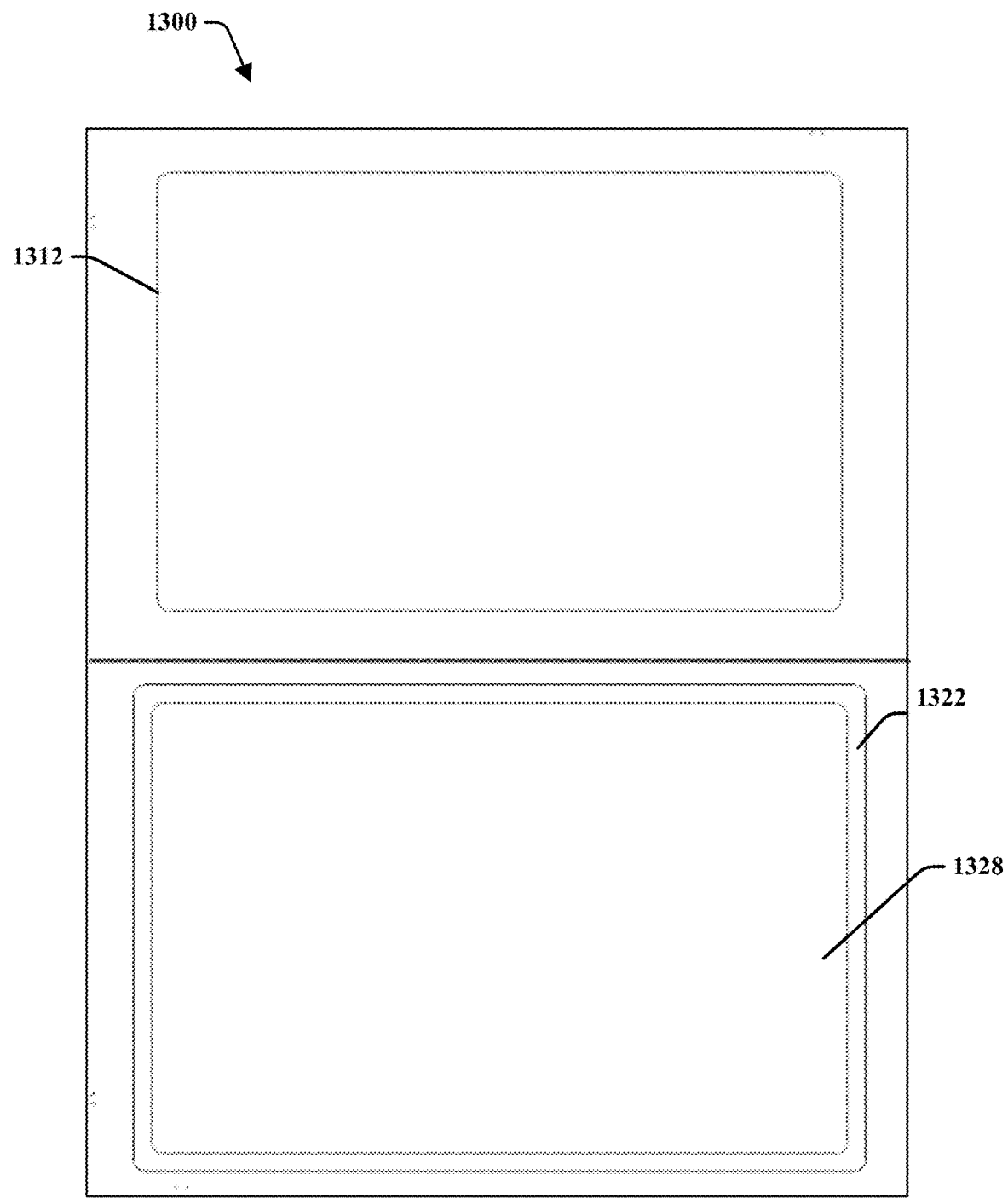
FIG. 13 is a front view of a laminating label assembly including one label and one laminae overlay in accordance with various described embodiments.

FIG. 13 is a front view of a laminating label assembly 1300 including label 1312 and laminae overlay 1322 in accordance with various described embodiments. In another aspect, protective liner 1328 may be removed to expose an adhesive side of laminae overlay 1322. In at least one embodiment, laminating label assembly 1300 may include a single label 1312.

Figure 15:
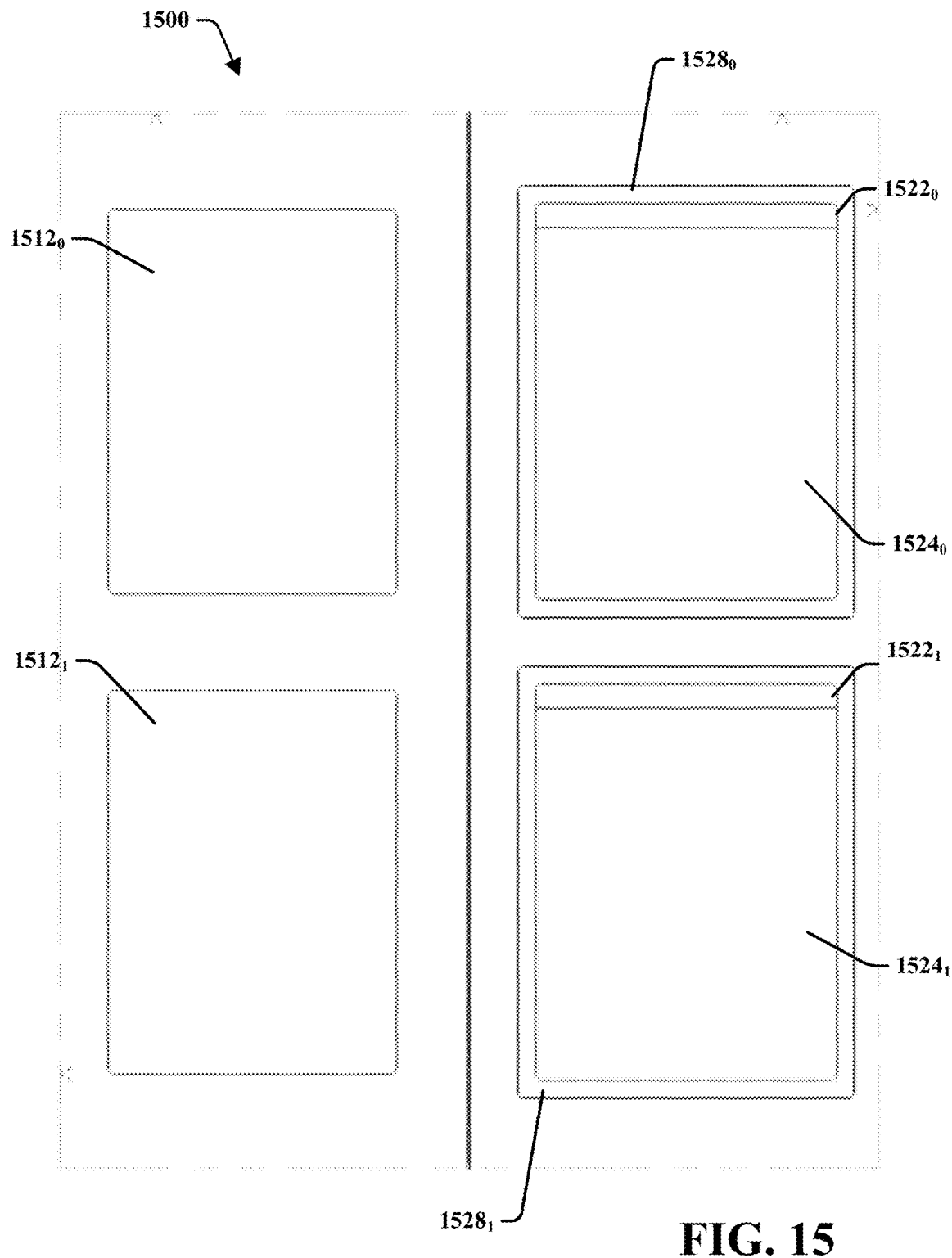
FIG. 15 is a front view of a laminating label assembly including multiple removable cover members in accordance with various described embodiments.

FIG. 15 is a front view of a laminating label assembly 1500 in accordance with various described embodiments. Laminating label assembly 1500 may include one or more labels $1512_0$ and $1512_1$ and one or more laminae overlays $1528_0$ and $1528_1$. As described by various embodiments disclosed herein, laminae overlays $1528_0$ and $1528_1$ may be formed or disposed within a layer of laminating label assembly 1500 that may not be viewable from the front view of FIG. 15. However, laminae overlays $1528_0$ and $1528_1$ are depicted for purposes of explanation and example. Laminating label assembly 1500 may include removable cover portions $1524_0$, $1524_1$, $1522_0$, and 15221. In an aspect, a user may chose to remove one or more of removable cover portions $1524_0$, $1524_1$, $1522_0$, and 15221.

Figure 16:
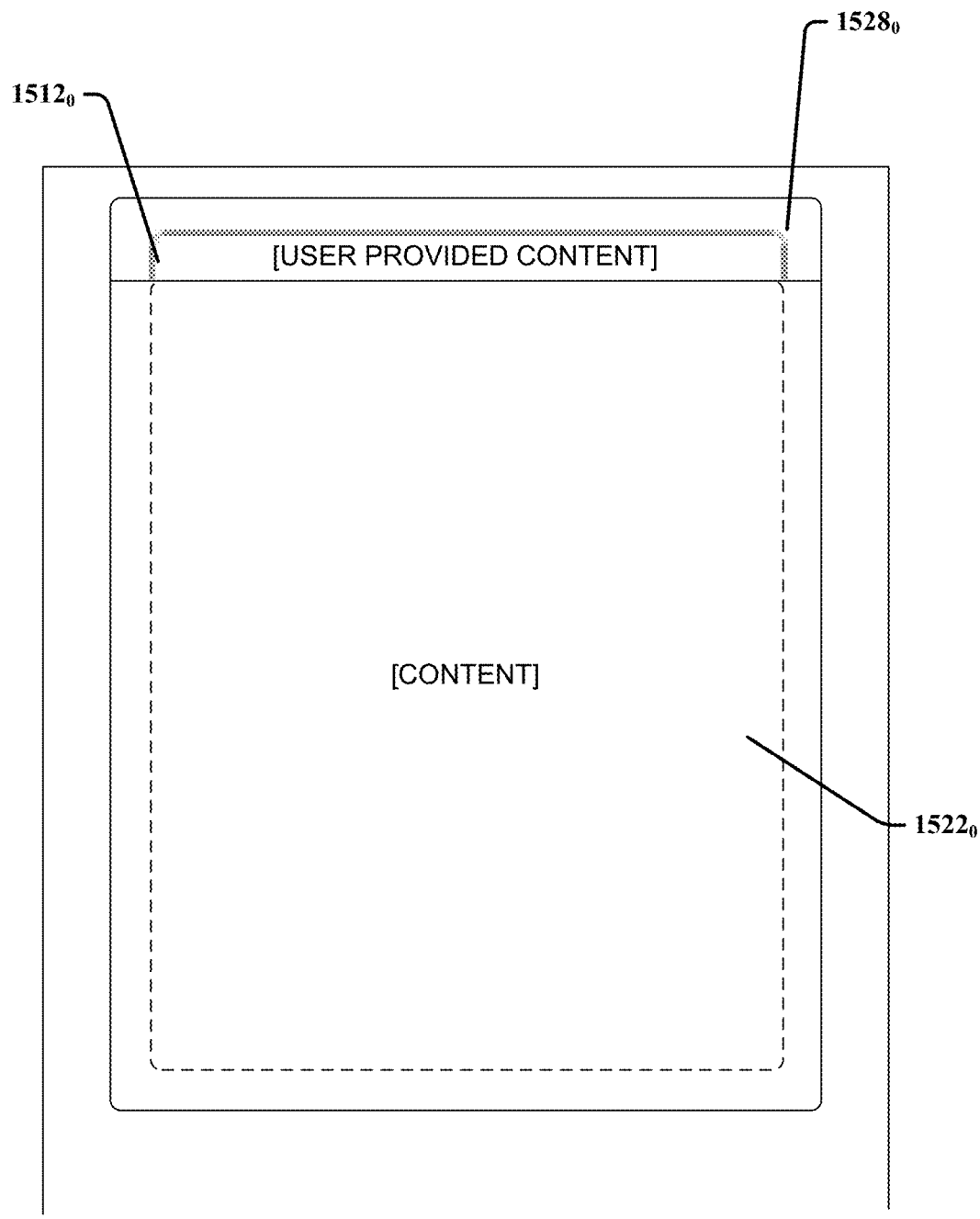
FIG. 16 is a back view of a laminating label assembly in a folded configuration including multiple removable cover members in accordance with various described embodiments.

In an example, removable cover portion $1522_0$ is removed to expose an adhesive portion of laminae overlay $1528_0$. A user may write on or a printer may print on the label $1512_0$ in a portion corresponding to where removable cover expose an adhesive portion will contacted if folded. When the laminating label assembly 1500 is folded, the exposed adhesive portion may adhere to label $1512_0$. As shown in FIG. 16, at least a portion of label $1512_0$ may be visible through laminae overlay $1528_0$. As depicted as a dashed line, a backside of removable cover portion $1522_0$ may be viewable through laminae overlay $1528_0$. It is noted that a portion of laminae overlay $1528_0$ may frame or overlap label $1512_0$ and/or removable cover portion $1522_0$. As such, when removed from laminating label sheet 1500, the portion that frames an adhesive portion of laminae overlay $1528_0$ may adhere to a surface. In another example, removable cover portion $1522_0$ and/or removable cover portion $1522_1$ may be removed.

Figure 17A:
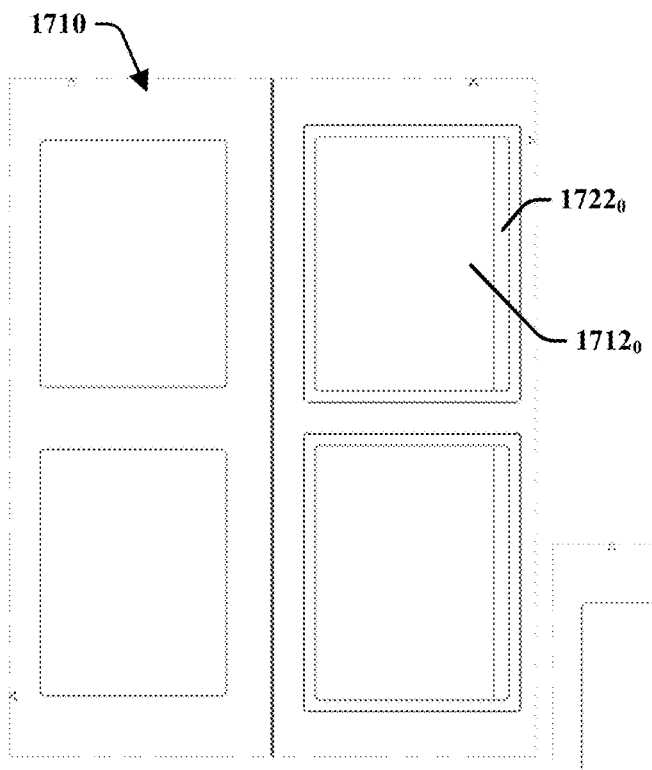
FIG. 17A-C are front views of laminating label assemblies including multiple removable cover members in accordance with various described embodiments.
Figure 17B:
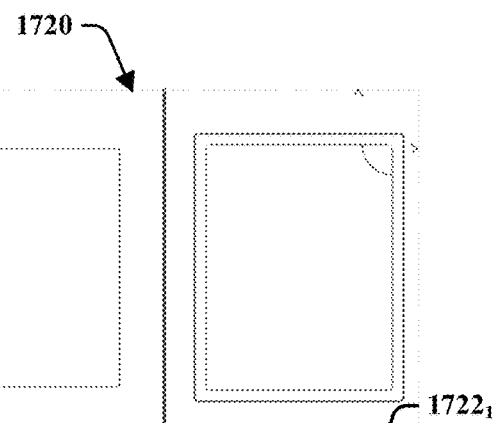
Figure 17C:
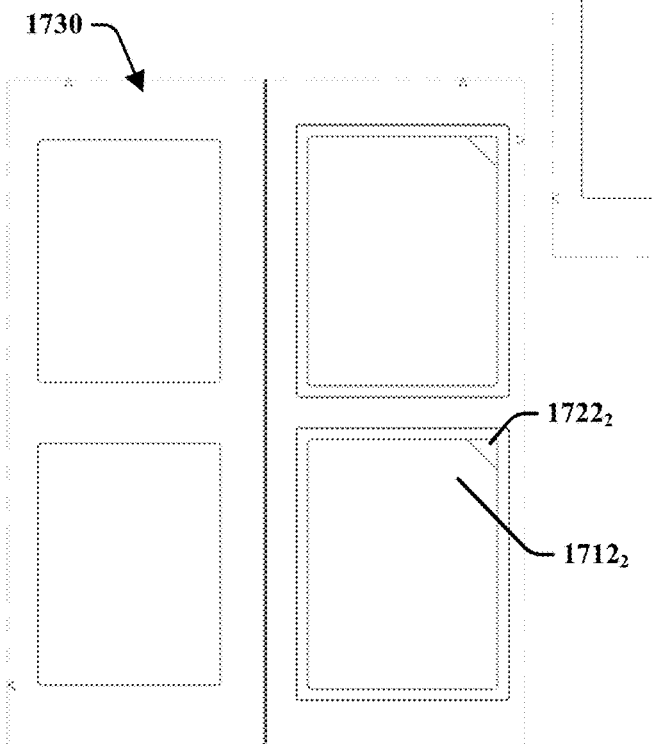

It is noted that various other configurations of laminating label assemblies having removable or optionally removable cover potions may be utilized. For instance, FIGS. 17A, 17B, and 17C respectively depict laminating label assemblies 1710, 1720, and 1730. As shown removable cover potions $1712_0$, $1712_1$, $1722_0$, $1722_1$, $1712_2$, and $1722_2$ may be various shapes and configurations. Furthermore, a different number of removable cover potions may be utilized. For example, with reference to FIG. 4, protective liner $428_0$ may comprise any number of removable cover portions.

Figure 18:
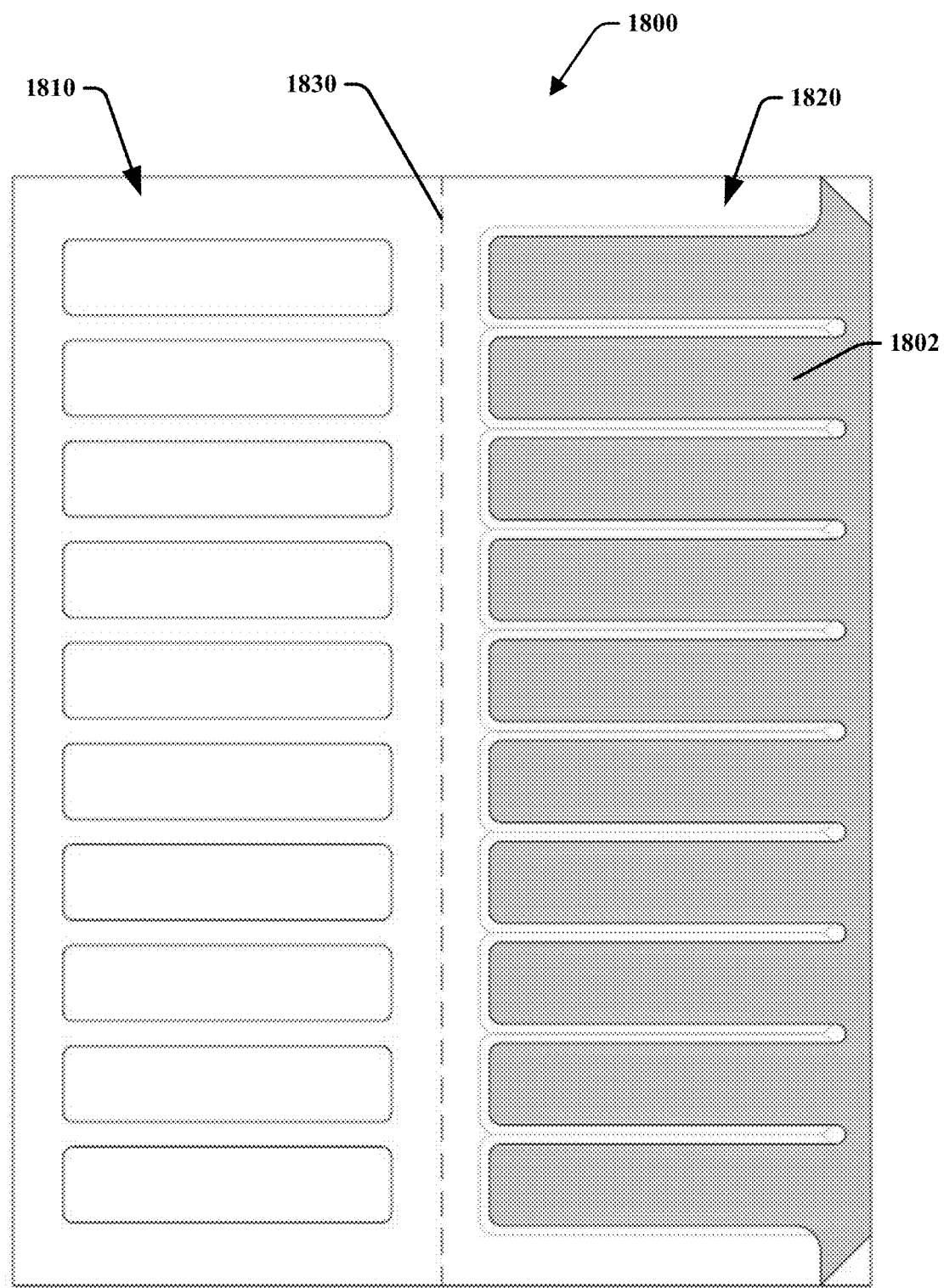
FIG. 18 is a front view of a laminating label assembly including a protective cover member covering multiple laminae overlays in accordance with various described embodiments.

FIG. 18 is a front view of a laminating label assembly 1800 including protective cover member 1802 in accordance with various described embodiments. In an aspect, protective cover member 1802 may be disposed on at least a portion of laminating sheet 1820. While a single protective cover member 1802 is depicted, it is noted that laminating label assembly 1800 may include a different number of protective cover members and/or different configurations of protective cover member(s).

Protective cover member 1802 may cover at least a portion of one or more laminae overlays. In an embodiment, a user may remove the protective cover member 1802 to expose plurality of laminae overlays, or at least a portion of each of the laminae overlays. As depicted, a user may peel or otherwise remove protective cover member 1802 to expose adhesive portions of each laminae overlay. In an aspect, a user may fold a corner of laminating label assembly 1800 to increase the user's ability to peel or remove the protective cover member 1802.

In at least one embodiment, removal of protective cover member 1802 may also expose a portion of a waste matrix (e.g., matrix 105). In other embodiments, removal of protective cover member 1802 may include removal of a portion of a matrix. The portion of the matrix may include a portion matching a shape of the protective cover member 1802.

Figure 19:
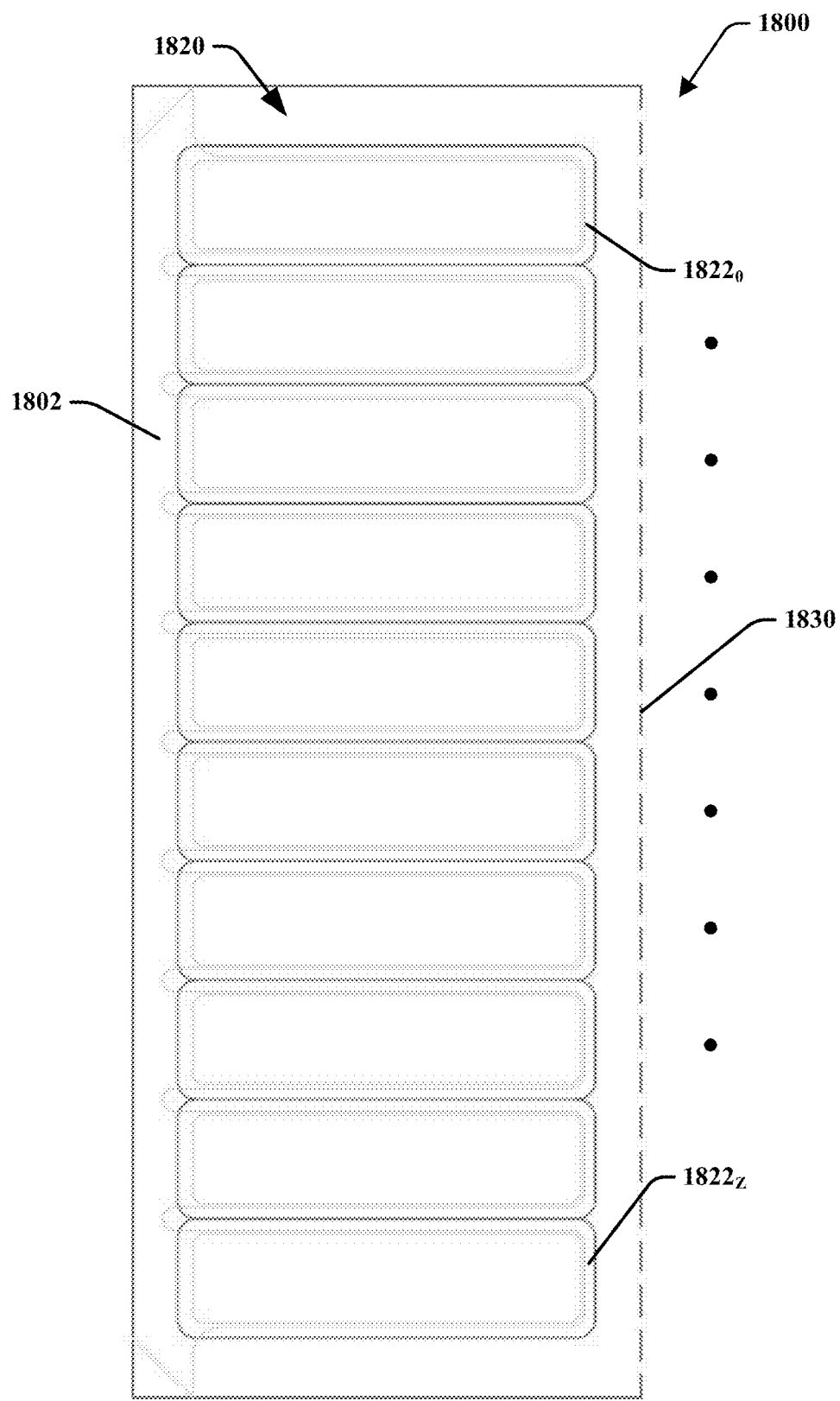
FIG. 19 is a back view of a laminating label assembly in a folded configuration including a protective cover member covering multiple laminae overlays in accordance with various described embodiments.

Turning to FIG. 19, with reference to FIG. 18, there is a view of a laminating label assembly 1800 in a folded configuration. As depicted, a backside of laminating sheet 1820 is viewable. In an aspect, laminating label assembly 1800 is folded at an alignment member 1830 such that laminating sheet 1820 is above label sheet 1820. In an aspect, if protective cover member 1802 is removed, then laminae overlays $1822_0$-$1822_Z$ may be exposed and adhered to one or more labels.

While protective cover member 1802 is depicted as comprising a single or unitary construction and having a particular shape, it is noted that various other configurations are considered within the scope and spirit of one or more embodiments described herein. For example, protective cover member 1802 is depicted as being on a side of laminating sheet 1830, however, it is noted that various other configurations may be utilized such as depicted in FIGS. 20-22.

Figure 20:
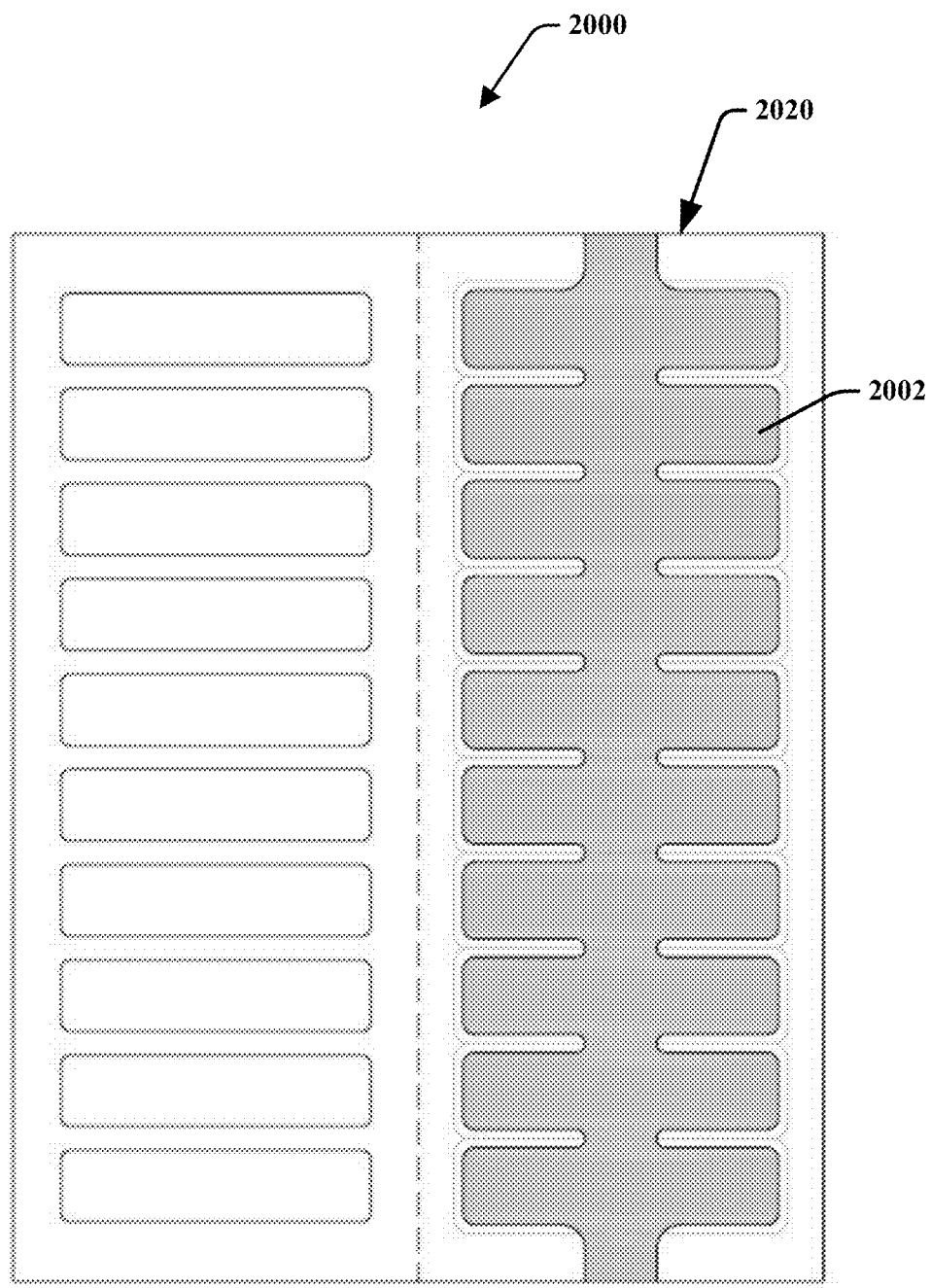
FIG. 20 is a front view of a laminating label assembly including a protective cover member covering multiple laminae overlays in accordance with various described embodiments.

FIG. 20 is a laminating label assembly 2000 comprising a protective cover member 2002 disposed on a laminating sheet 2020. Protective cover sheet 2002 may comprise one or more portions that are disposed at an edge of laminating sheet 2020. In an aspect, having a portion disposed at an edge may allow for a user to easily separate or remove the protective cover member 2002 from the laminating sheet 2020. By way of example, a user may initially lift or peel a top portion of protective cover member 2002. The user may then peel the protective cover sheet 2002 until it is completely removed. As described in various embodiments, protective cover member 2002 may comprise one or more sub-portions. For instance, the protective cover member 2002 may comprise an upper protective cover portion that covers a first set of laminae overlays and a lower protective cover portion that covers a second set of laminae overlays.

Figure 21:
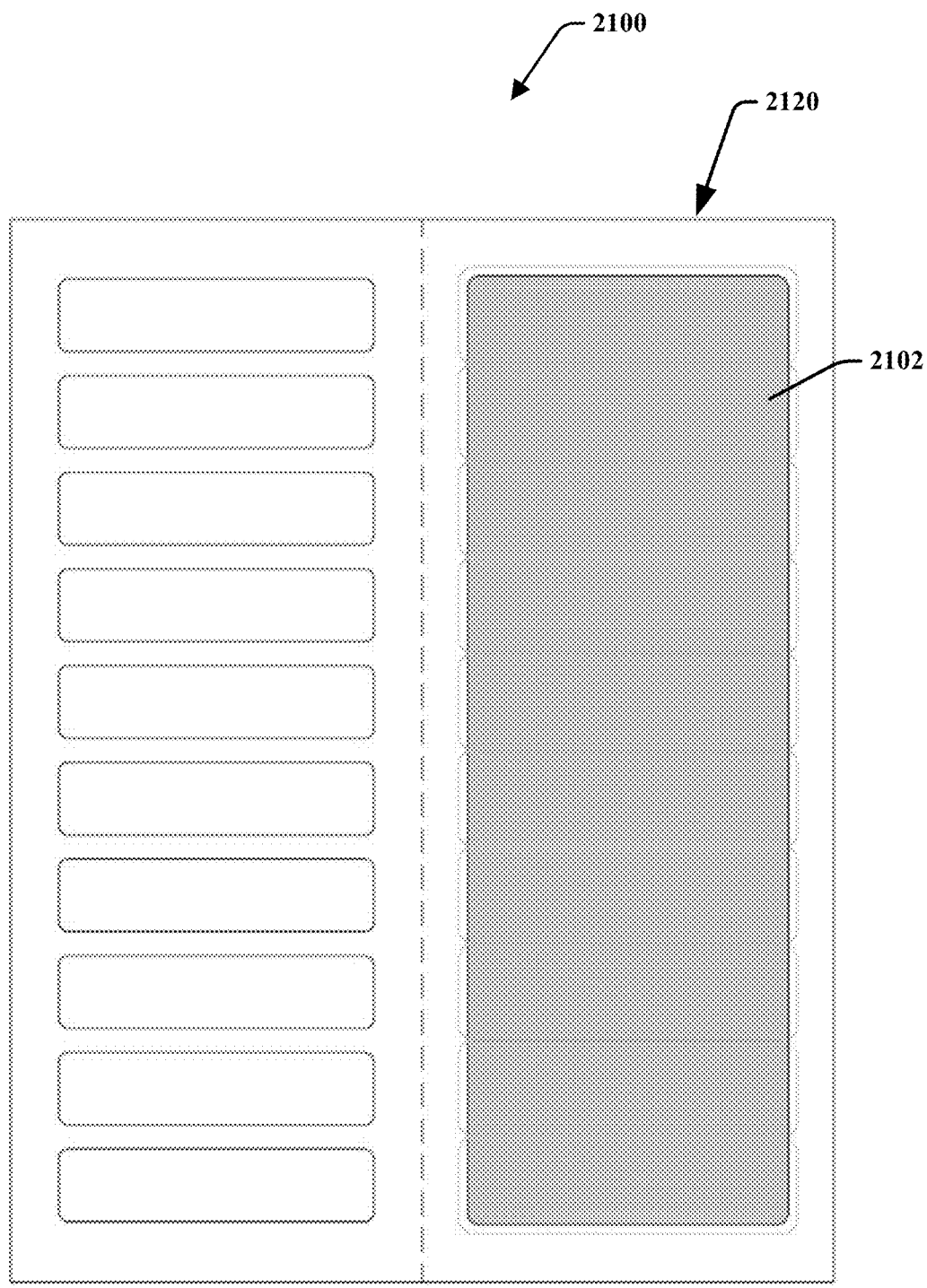
FIG. 21 is a front view of a laminating label assembly including a protective cover member covering multiple laminae overlays in accordance with various described embodiments.

FIG. 21 is a laminating label assembly 2100 comprising a protective cover member 2102 that may comprise an area of a first side of laminating sheet 2120. In an aspect, a user may remove a protective cover member 2102 to expose a plurality of laminae overlays. As can be seen, the protective cover member 2102 may be smaller than the area covered by the plurality of laminae overlays such that the laminae overlays are not removed when the protective cover member 2102 is removed.

Figure 22:
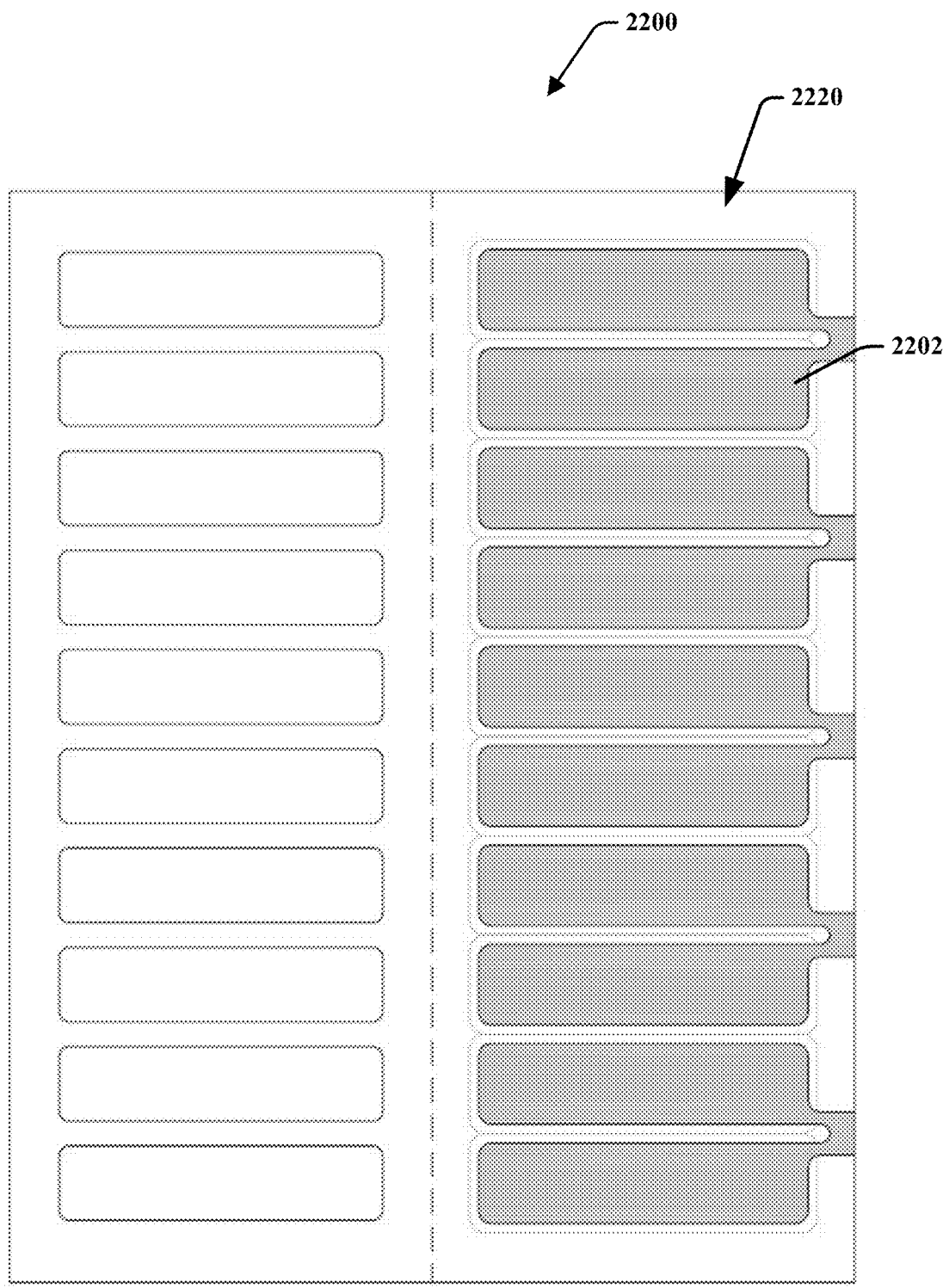
FIG. 22 is a front view of a laminating label assembly including a protective cover member covering multiple laminae overlays in accordance with various described embodiments.

Furthermore, as depicted in FIG. 22, a laminating label assembly 2200 may include one or more protective cover members 2202 that may each cover one or more laminae overlays, such that a user may expose adhesive portions of the one or more laminae overlays by removing a single cover member. As depicted, protective cover members 2202 may be configured to cover two laminae overlays. Thus, a user may selectively remove cover members to expose desired laminae overlays. Such can improve efficiency and increase user satisfaction.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The features of each embodiment described and shown herein may be combined with the features of the other embodiments described herein. The claims as follows are intended to include all modifications and alterations insofar as they come within the scope of the claims or the equivalent thereof.

Having thus described the invention, we claim:

1. A laminating label assembly, comprising:
    a label sheet comprising at least one label formed in a facestock layer and a liner layer releasably adhered to a bottom facing side of the facestock layer;
    a laminae layer comprising at least one laminae overlay at least partially precut in the laminae layer and surrounded by a matrix and an edge portion attached to a corresponding edge portion of the liner layer on an opposite facing from the facestock layer;
    a laminating sheet comprising a liner sheet having at least one protective liner at least partially precut in the liner sheet;
    an alignment member formed at least partially in the laminae layer and disposed between the label sheet and the laminating sheet;
    wherein the alignment member is configured to align a label of the at least one labels with a corresponding laminae overlay of the at least one laminae overlay when the laminating label assembly is folded along the alignment member;
    wherein the laminating sheet is releasably adhered to the laminae layer, at least one protective liner and at least one laminae overlay;
    wherein a portion of the liner layer is not covered by the laminae layer; and
    wherein the protective liner is smaller than said laminae overlay.

2. The laminating label assembly according to claim 1, wherein the liner is not coated on a facing attached to the laminae layer.

3. The laminating label assembly according to claim 1, wherein the at least one labels are at least partially precut in the facestock sheet.

4. The laminating label assembly according to claim 1, wherein the alignment member comprises at least one perforated line formed in at least one of the label sheet or the laminating sheet.

5. The laminating label assembly according to claim 1, wherein the matrix comprises a waste material is separable from at least one of the label sheet or the laminating sheet.

6. The laminating label assembly of claim 1, wherein when the label sheet and the laminating sheet are folded and allowed to rest in an equilibrium position, wherein the equilibrium position comprises an angle of substantially sixty degrees or less.

7. The laminating label assembly of claim 6, wherein the angle is in the range of substantially fifteen degrees to substantially sixty degrees.

8. The laminating label assembly of claim 6, wherein the angle is in the range of substantially fifteen degrees to substantially forty-five degrees.

9. The laminating label assembly of claim 6, wherein the angle is substantially forty-five degrees.

10. The laminating label assembly of claim 1 comprising a plurality of labels having a layer of adhesive disposed between the facestock layer and the liner layer,
    a plurality of protective liners, and a plurality of corresponding laminae overlays.

11. The laminating label assembly of claim 10, wherein the alignment member comprises a weakened portion of the laminating label assembly.

12. The laminating label assembly of claim 10, wherein the alignment member comprises a notched member of the laminating label assembly.

13. The laminating label assembly of claim 10, wherein the alignment member comprises a portion of the laminating label assembly having at least a portion of material removed.

14. The laminating label assembly of claim 10, wherein the alignment member comprises indicia indicating a portion of the laminating label assembly that is to be folded for proper alignment of the label and the laminae overlay.

15. The laminating label assembly of claim 10, wherein when the label sheet and the laminating sheet are folded at the alignment member and allowed to rest in an equilibrium position, wherein the equilibrium position comprises an angle of substantially sixty degrees or less.

16. The laminating label assembly of claim 15, wherein the angle is in the range of substantially fifteen degrees to substantially sixty degrees.

17. The laminating label assembly of claim 15, wherein the angle is in the range of substantially fifteen degrees to substantially forty-five degrees.

18. The laminating label assembly of claim 15, wherein the angle is substantially forty-five degrees.

19. The laminating label assembly of claim 1, wherein the protective liner is removeable from the laminating sheet.

20. A laminating label assembly comprising:
    a label sheet comprising a label releasably adhered to a first liner sheet;
    a laminating sheet comprising a second liner sheet having a laminae layer releasably adhered on a first side, including a laminae overlay cut into the laminae layer and surrounded by a matrix, and a cover member releasably adhered to a second side so that the cover member is positioned on an immediately opposite to the laminae overlay; and
    an alignment member formed along an edge of the laminating sheet and connecting the label sheet to the laminating sheet while leaving a portion of the first liner sheet adjacent to the edge exposed to form the laminating label assembly, wherein the label and the cover member are disposed on one side of the laminating label assembly and the laminae overlay is disposed on an opposing side of the laminating label assembly and wherein, when the alignment member is folded, the label and the laminae overlay adhere to one another after the cover member is removed to form an adhered label combination and the adhered label combination is removable from the first side of said laminating sheet.

21. The laminating label assembly of claim 20, wherein the cover member comprises a first releasable portion and a second releasable portion.

22. The laminating label assembly of claim 21, upon releasing the first releasable portion, an adhesive portion of the laminae overlay on the one side of the laminating label assembly is exposed.

23. The laminating label assembly of claim 22, wherein the second releasable portion comprises preprinted information formed on the one side of the laminating assembly.

24. The laminating label assembly of claim 22, wherein the exposed adhesive portion is configured to adhere to a portion of the label.

25. The laminating label assembly of claim 20, wherein the cover member covers an adhesive portion of the laminae overlay.

26. The laminating label assembly of claim 20, wherein at least a portion of the cover member is disposed at a different edge of the laminating sheet in comparison to the edge of the laminating sheet that connects the label sheet to the laminating sheet.

27. The laminating label assembly of claim 20, wherein when the label sheet and the laminating sheet are folded and allowed to rest in an equilibrium position, wherein the equilibrium position comprises an angle of substantially sixty degrees or less than substantially sixty degrees.

28. The laminating label assembly of claim 27, wherein the angle is in the range of substantially fifteen degrees to substantially sixty degrees.

29. The laminating label assembly of claim 27, wherein the angle is in the range of substantially fifteen degrees to substantially forty-five degrees.

30. The laminating label assembly of claim 27, wherein the angle is substantially forty-five degrees.

31. The laminating label assembly of claim 20, wherein the laminae overlay comprises a larger surface area than the label.

32. The laminating label assembly of claim 20, wherein the cover member comprises a larger surface area than the label.

33. The laminating label assembly of claim 20, wherein the laminae overlay comprises a larger surface area than the cover member.

34. The laminating label assembly of claim 20 further comprising a plurality of labels, laminae overlays, and cover members.

* * * * *